United States Patent
Varghese et al.

(10) Patent No.: US 9,988,173 B2
(45) Date of Patent: Jun. 5, 2018

(54) METHOD OF ROBOT ASSISTED AUTOMATED DECAL APPLICATION ON COMPLEX THREE DIMENSIONAL SURFACES

(71) Applicant: 3M INNOVATIVE PROPERTIES COMPANY, St. Paul, MN (US)

(72) Inventors: Aby Varghese, Bangalore (IN); Murthy V. N. Arelekatti, Bangalore (IN); Dhritisunder Bhattacharya, Bangalore (IN)

(73) Assignee: 3M Innovative Properties Company, St. Paul ( * ) Notice: Subject to any disclaimer, the term of this patent is extended or adjusted under 35 U.S.C. 154(b) by 33 days.

(21) Appl. No.: 15/024,531

(22) PCT Filed: Sep. 25, 2014

(86) PCT No.: PCT/US2014/057438
§ 371 (c)(1),
(2) Date: Mar. 24, 2016

(87) PCT Pub. No.: WO2015/048276
PCT Pub. Date: Apr. 2, 2015

(65) Prior Publication Data
US 2016/0229577 A1    Aug. 11, 2016

(30) Foreign Application Priority Data
Sep. 27, 2013   (IN) .......................... 1115/KOL/2013

(51) Int. Cl.
*B65C 9/00* (2006.01)
*B65C 9/38* (2006.01)
(Continued)

(52) U.S. Cl.
CPC ........ *B65C 9/0006* (2013.01); *B29C 63/0073* (2013.01); *B65C 9/0015* (2013.01);
(Continued)

(58) Field of Classification Search
USPC .... 156/247, 249, 289, 350, 258, 379.8, 391, 156/538
See application file for complete search history.

(56) References Cited

U.S. PATENT DOCUMENTS 3,399,097 A * 8/1968 Vissage .................... B65C 5/00
100/214
3,970,508 A * 7/1976 Gossie .................. B65C 9/0015
15/97.1

(Continued)

FOREIGN PATENT DOCUMENTS

EP         2298510       3/2011
WO    WO 2012/104251    8/2012

OTHER PUBLICATIONS

International Search Report for PCT International Application No. PCT/US2014/057438, dated Jan. 8, 2015, 3 pages.

*Primary Examiner* — Sing P Chan
(74) *Attorney, Agent, or Firm* — Philip P. Soo

(57) ABSTRACT

The present Invention discloses two robot assisted automated methods for application of decals on complex 3 dimensional surfaces without wrinkle and bubble. The method includes loading of objects having 3D surfaces on an object holding fixture manually from a conveyor belt, picking up a first application fixture automatically by a robot, peeling off the liner disposed on the decal manually and placing the decal on the first application fixture which holds the decal by suction, positioning the decal with exposed adhesive accurately on a first 3D surface of the object and switching off the suction automatically leaving the decal placed on the 3D surface of the object, placing the first (Continued)

application fixture back and picking up a second application fixture automatically by the robot for squeegee application, applying the second application fixture to complete the squeegee application by pressurizing the decal. The first application fixture is configured to be programmed to hold decals of different shape and size and the second application fixture is configured to be programmed to identify the 3D direction of squeezing pad motion within each region of such decals to eliminate the bubbles without wrinkling. The second method uses a mechatronic pick and place mechanism for picking up a decal from the decal stack and placing of the decal on the 3D surface of the object automatically.

14 Claims, 21 Drawing Sheets

(51) Int. Cl.
  B65C 9/40      (2006.01)
  B29C 63/00     (2006.01)
  B29C 63/02     (2006.01)
  B29C 65/00     (2006.01)
  B29C 65/78     (2006.01)
  B32B 7/06      (2006.01)
  B32B 37/26     (2006.01)
  B65C 9/36      (2006.01)

(52) U.S. Cl.
  CPC .............. B65C 9/36 (2013.01); B65C 9/40 (2013.01); B29C 63/0047 (2013.01); B29C 2063/027 (2013.01); B65C 2009/0018 (2013.01)

(56) References Cited

U.S. PATENT DOCUMENTS

| 4,124,436 | A |   | 11/1978 | Pettis, Jr. et al. |
| 4,561,921 | A |   | 12/1985 | Treiber |
| 4,620,354 | A | * | 11/1986 | Hess ............... B23P 19/047  29/235 |
| 4,696,707 | A | * | 9/1987  | Lewis .............. B29C 70/386  156/350 |
| 4,725,327 | A |   | 2/1988  | Matuda et al. |
| 4,801,348 | A | * | 1/1989  | Takagaki ........... B65C 3/16  156/456 |
| 4,927,479 | A | * | 5/1990  | Bock .............. B30B 15/06  156/228 |
| 5,117,348 | A | * | 5/1992  | Romero ............ B29C 70/388  156/350 |
| 5,490,080 | A | * | 2/1996  | Jarrige ............ B44D 2/00  118/301 |
| 5,640,000 | A |   | 6/1997  | Spriet et al. |
| 5,645,669 | A | * | 7/1997  | Crankshaw ......... B65C 1/04  156/212 |
| 5,733,410 | A | * | 3/1998  | Gore .............. B29C 63/02  156/542 |
| 5,779,830 | A | * | 7/1998  | Wakefield ......... B29C 66/4722  156/107 |
| 6,220,331 | B1 | * | 4/2001  | Matsuda ........... B65H 35/0013  156/235 |
| 6,841,027 | B2 | * | 1/2005  | Muffler ........... B32B 37/0007  156/285 |
| 6,852,186 | B1 | * | 2/2005  | Matsuda ........... B65H 35/0013  156/230 |
| 7,093,641 | B2 | * | 8/2006  | Sharp ............. B65H 35/0013  156/353 |
| 7,093,642 | B2 | * | 8/2006  | Sharp ............. B65H 21/00  156/361 |
| 7,374,625 | B2 | * | 5/2008  | Panetta ........... B65H 35/0013  156/250 |
| RE40,885  | E  | * | 9/2009  | Sharp ............. B65H 35/0013  156/353 |
| 7,895,735 | B2 | * | 3/2011  | Liao .............. H02K 15/03  156/542 |
| 8,123,894 | B2 | * | 2/2012  | Sung .............. B32B 37/003  156/286 |
| 8,196,636 | B2 | * | 6/2012  | Sung .............. B32B 37/003  156/579 |
| 8,322,005 | B2 | * | 12/2012 | Buse .............. B23P 19/047  29/235 |
| 8,528,473 | B2 | * | 9/2013  | Oetjen ............ B32B 37/0046  100/233 |
| 8,808,483 | B2 | * | 8/2014  | Sung .............. B32B 17/10036  156/214 |
| 8,857,490 | B2 | * | 10/2014 | Sung .............. B32B 37/003  156/538 |
| 2003/0183327 | A1 | * | 10/2003 | Titze ............. B29C 63/02  156/212 |
| 2007/0234492 | A1 | * | 10/2007 | Svendsen .......... A47L 5/30  15/21.1 |
| 2012/0167917 | A1 | * | 7/2012  | Gilbert, Jr. ...... A47L 11/408  134/6 |
| 2014/0076226 | A1 | * | 3/2014  | Smith ............. B63B 59/10  114/222 |
| 2014/0182627 | A1 | * | 7/2014  | Williams .......... A47L 11/30  134/21 |

* cited by examiner

2804
String hooked onto the liner

2802
DC motor with the wound string
Motor operated intermittently in conjunction with the simultaneous application of the decal by the robot to gradually expose the adhesive 2902 — Suction cup pulling away the liner, by mechanical movement of the suction cup 2904 — Vaccum cup holding the graphic (static)

METHOD OF ROBOT ASSISTED AUTOMATED DECAL APPLICATION ON COMPLEX THREE DIMENSIONAL SURFACES

CROSS REFERENCE TO RELATED APPLICATIONS

This application is a national stage filing under 35 U.S.C. 371 of PCT/US2014/057438, filed Sep. 25, 2014, which claims the benefit of India Application No. 1115/KOL/2013, filed Sep. 27, 2013, the disclosures of which are incorporated by reference in their entireties herein.

FIELD OF THE INVENTION

The present invention generally relates to a process automation for application of graphic films on three dimensional surface. In particular, the present invention discloses an industrial robot assisted automation process for applying decorative graphic films (also referred as decal) constrained to a given two dimensional shape on an exclusive, specified complex three dimensional freeform surface without wrinkling of film and without entrapment of bubbles. The invention also discloses a consistent, precise, reprogrammable adaptable system addressing total application from picking of the film from stack to applying it on the contoured surface especially on the fuel tanks of the bikes.

BACKGROUND OF THE INVENTION

For the past two decades, there has been a rapid geographical shift in the global market for two wheeled automobiles such as motorcycles, scooters and mopeds towards Asia-Pacific region. Developing nations in Asia and Latin America such as India, Brazil and Indonesia currently face an exponentially rising demand for two wheelers. Two wheelers are perceived as essential, affordable and quick media of transportation by the consumers in these countries. Consequently, the manufacturing of two wheelers has also been concentrated to these regions by multinational and local Original Equipment Manufacturers (OEMs).

Given the aesthetic requirements of design, the shapes of bike parts in particular the fuel tanks have complex three dimensional contours for different models of same or different manufacturers. Bike graphics are considered aesthetically critical and hence there has been increasing focus on flawless application of these decals on the production line.

Adhering decals on these 3D surfaces is a complex and a skill oriented manual task at all OEMs. Extremely accurate positioning of the decal and completely bubble-free, wrinkle-free application are all mandatory to meet the strict quality standards. Repeated trials are carried out to establish standard application procedures and to train the applicators.

Decal applicators are often contracted for short spans of time by OEMs, who leave upon expiry of their contracts. This result in increase of the time spent in training the newly hired applicators. Continuously changing design variants of decals for different models of bikes exacerbates the magnitude of above mentioned problems.

In view of the above discussion it may be realized that there exists a need to provide an improved system and method of automated application of the decals on the complex 3D surfaces without having bubbles or wrinkles.

SUMMARY OF THE INVENTION

The main object of the present invention is to provide an industrial robot assisted automation process for applying decals or graphic films on complex 3D surfaces without wrinkling or without entrapment of bubbles.

Another object of the present invention is to provide an industrial robot assisted automation process for applying decals or graphic films on complex 3D surfaces without wrinkling or without entrapment of bubbles, which may reduce wastage and produce economical decals.

Another object of the present invention is to provide an industrial robot assisted automation process for applying decals or graphic films on complex 3D surfaces without wrinkling or without entrapment of bubbles, which may eliminate human errors.

Another object of the present invention is to provide an industrial robot assisted automation process for applying decals or graphic films on complex 3D surfaces without wrinkling or without entrapment of bubbles, which provides a much faster process.

Another object of the present invention is to provide an industrial robot assisted automation process for applying decals or graphic films on complex 3D surfaces without wrinkling or without entrapment of bubbles, which may be adaptable and programmable to suit changing decal designs, tank designs and for different OEMs.

In order to achieve the above mentioned objects, the present invention discloses a method of robot assisted automated decal application on complex 3D surfaces without resulting in wrinkling and without entrapment of bubbles. The method includes loading of objects having 3D surfaces on an object holding fixture manually one by one by an operator from a conveyor belt, picking up a first application fixture automatically by a robot and facing the first application fixture towards the operator, peeling off the liner disposed on the decal manually by the operator and placing the decal on the first application fixture which holds the decal by suction, positioning the decal with exposed adhesive accurately on a first 3D surface of the object and switching off the suction automatically leaving the decal placed on the 3D surface of the object, placing the first application fixture back and picking up a second application fixture automatically by the robot for squeegee application, applying the second application fixture to complete the squeegee application by pressurizing the decal, performing 180 degree revolution of the object automatically by the object holding fixture and repeating steps iii to vi on a second 3D surface of the object and unloading the object from the object holding fixture upon manual quality inspection by the operator, wherein the first application fixture is configured to be programmed to hold decals of different shape and size and the second application fixture is configured to be programmed to identify the 3D direction of squeezing pad motion within each region of such decals to eliminate the bubbles without wrinkling.

In another embodiment, a method of robot assisted automated decal application on complex 3D surfaces without resulting in wrinkling and without entrapment of bubbles is disclosed. The method includes loading of objects having 3D surfaces on an object holding fixture manually one by one by an operator from a conveyor belt, the object holding fixture is configured to lock the objects automatically, placing a decal stack on a stack platform manually by the operator, picking up a decal from the decal stack placed on the stack platform one by one automatically by a mechatronic pick and place mechanism, placing of the decal on first 3D surface of the object automatically by the mechatronic pick and place mechanism, performing a predefined revolution of the object automatically by the object holding fixture, applying a squeezing application fixture to complete the squeegee application by pressurizing the decal with a squeezing pad upon removal of liner, performing 180 degree revolution of the object automatically by the object holding fixture and repeating steps iii to vi on a second 3D surface of the object, and unloading the object from the object holding fixture upon manual quality inspection by the operator, wherein the mechatronic pick and place mechanism and the object holding fixture are configured to be programmed for accurate application of the decals of various size and shape on the 3D surface and squeezing application fixture is configured to be programmed to identify the 3D direction of squeezing pad motion within each region of such decals to eliminate the bubbles without wrinkling.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and other advantages of the invention will be better understood and will become more apparent by referring to the exemplary embodiments of the invention, as illustrated in the accompanying drawings, wherein.

DETAILED DESCRIPTION OF THE INVENTION

Reference will now be made to the exemplary embodiments of the invention, as illustrated in the accompanying drawings. Where ever possible same numerals will be used to refer to the same or like parts.

Disclosed herein is an industrial robot assisted automation process for applying decals or graphic films on complex 3D surfaces without wrinkling or without entrapment of bubbles. Two different embodiments of the invention automation process have been disclosed here.

Figure 1:
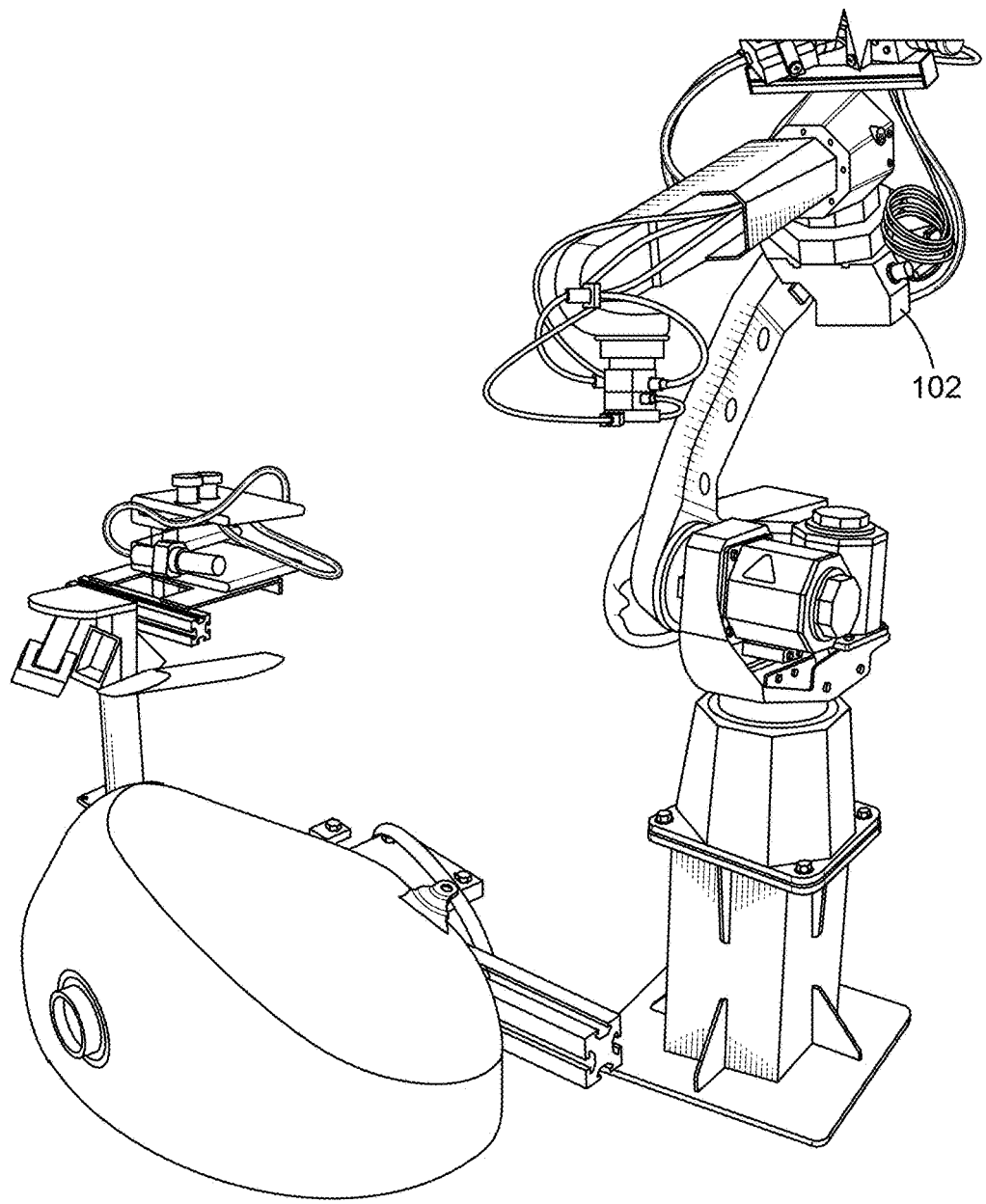
FIG. 1 illustrates an automated system for applying decals or graphic films on complex 3D surfaces without wrinkling or without entrapment of bubbles according to first embodiment of the present invention.
Figure 2:
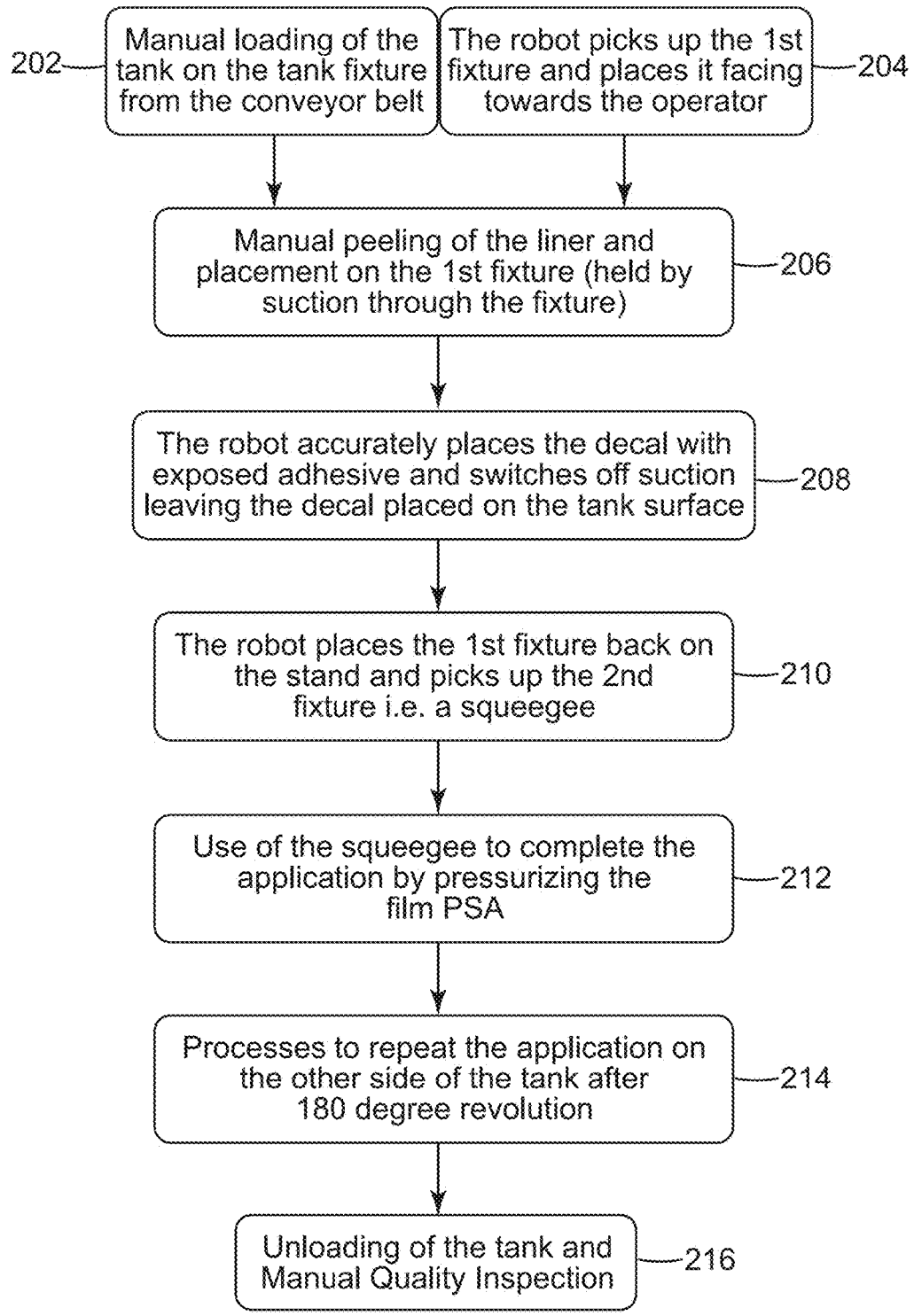
FIG. 2 is a flow diagram illustrating the different steps of the process automation for applying decals or graphic films on complex 3D surfaces without wrinkling or without entrapment of bubbles according to first embodiment of the present invention.

FIG. 1 illustrates an automated system and FIG. 2 is a flow diagram illustrating the different steps of the process automation for applying decals or graphic films on complex 3D surfaces without wrinkling or without entrapment of bubbles according to first embodiment of the present invention. It may be noted that more than one consecutive steps may be executed together based on feasibility to reduce the process cycle time.

Initially at step 202 manual loading of the objects (i.e. fuel tanks of two wheelers in this case) is performed by an operator on the object holding fixture from the conveyor belt. At step 204, the robot picks up the first application fixture automatically and places it facing towards the operator. At step 206, manual peeling of the liner is carried out by the operator and the decal is placed on the first application fixture, which is held by suction through the fixture. Next, the robot accurately places the decal with exposed adhesive and switches off the suction leaving the decal placed on the tank surface at step 208. At step 210, the robot places the first application fixture back and picks up a second application fixture for squeegee application. Then the squeegee is applied to complete the application by pressurizing the decal at step 212. The same process is then repeated for the application of the decal on the other side of the tank after 180 degree revolution at step 214. Finally at step 216, the tank is unloaded after manual quality inspection. Construction of the system elements for automated application of decals or graphic films on complex 3D surfaces will be explained below.

Figure 3:
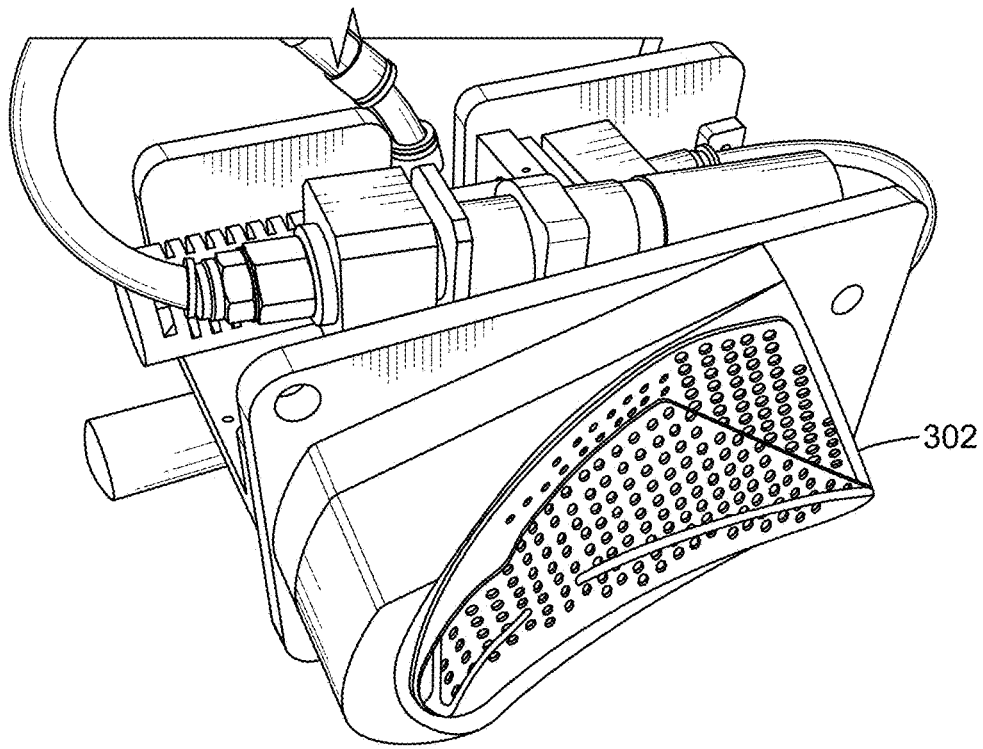
FIG. 3 illustrates cushioned 'negative' surface with holes in the normal plane for suction force to hold the film placed in the first application fixture according to one embodiment of the present invention.
Figure 4:
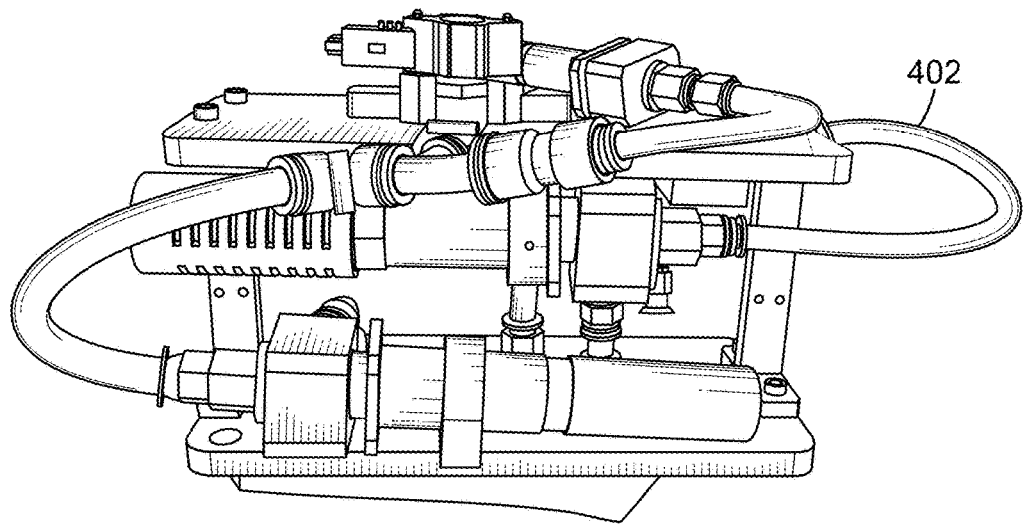
FIG. 4 illustrates the first application fixture in assembled state placed on a stand according to one embodiment of the present invention.
Figure 5:
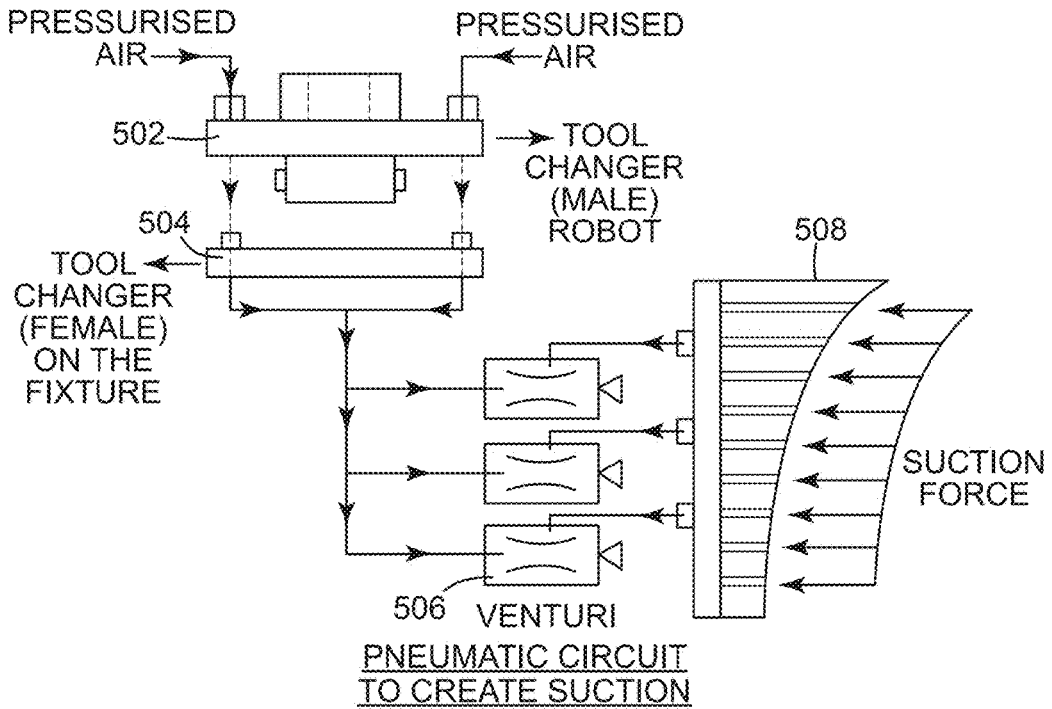
FIG. 5 illustrates a pneumatic circuit to create suction according to one embodiment of the present invention.
Figure 6:
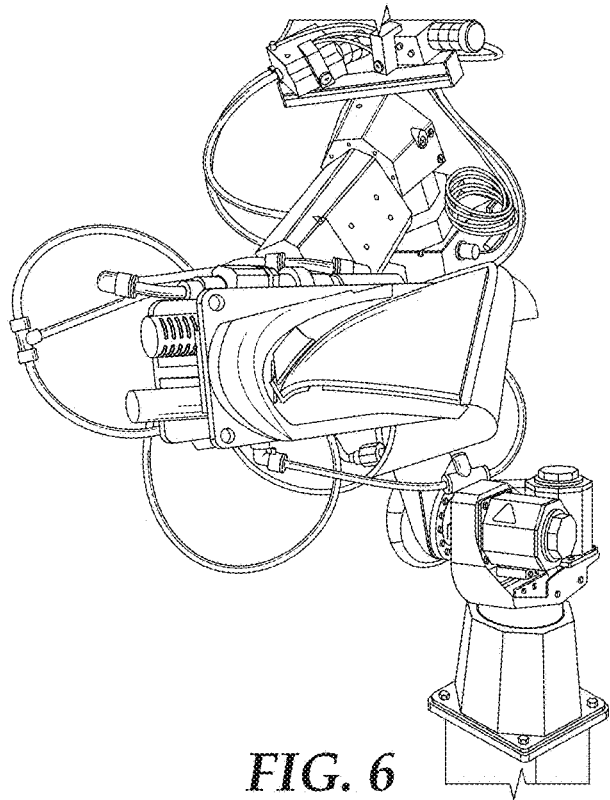
FIG. 6-9 illustrate mechanism of 'negative' surface of a first application fixture to hold the film to the desired 3D shape according to one embodiment of the present invention.
Figure 7:
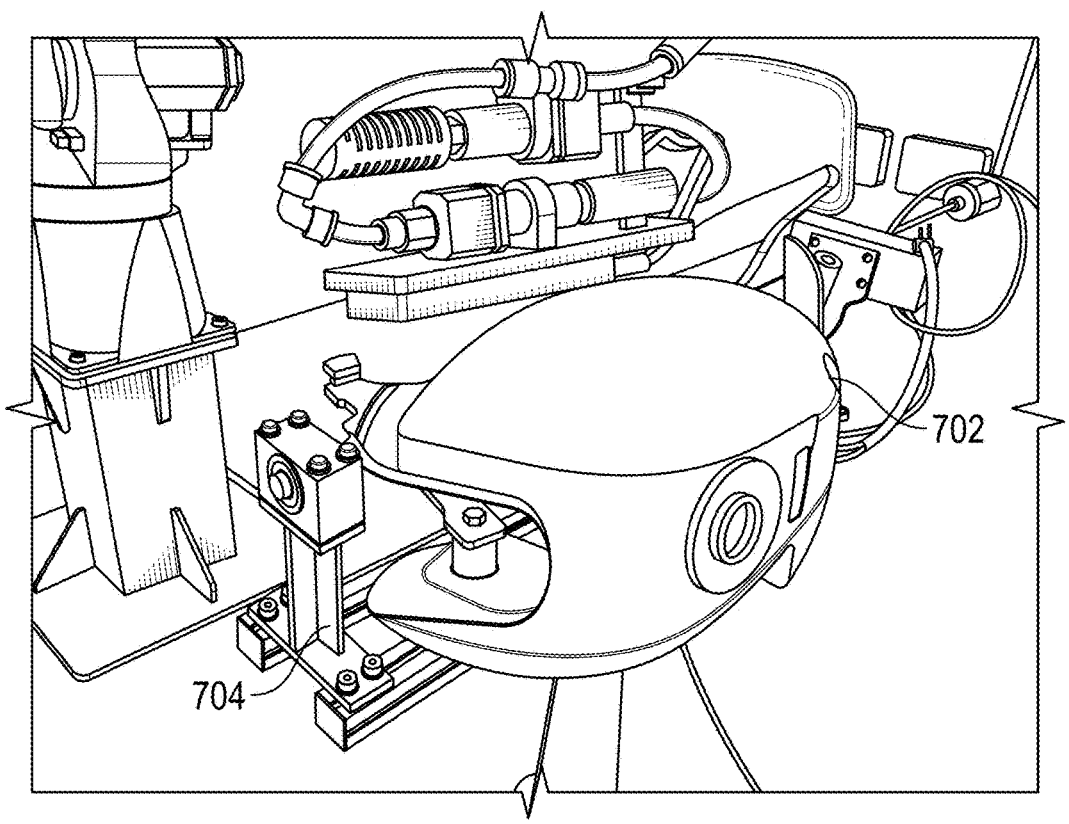
Figure 8:
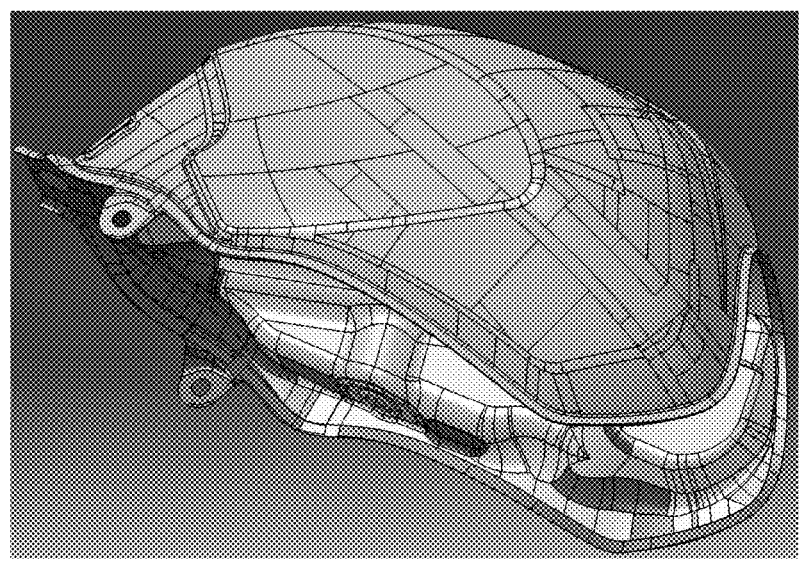
Figure 9:
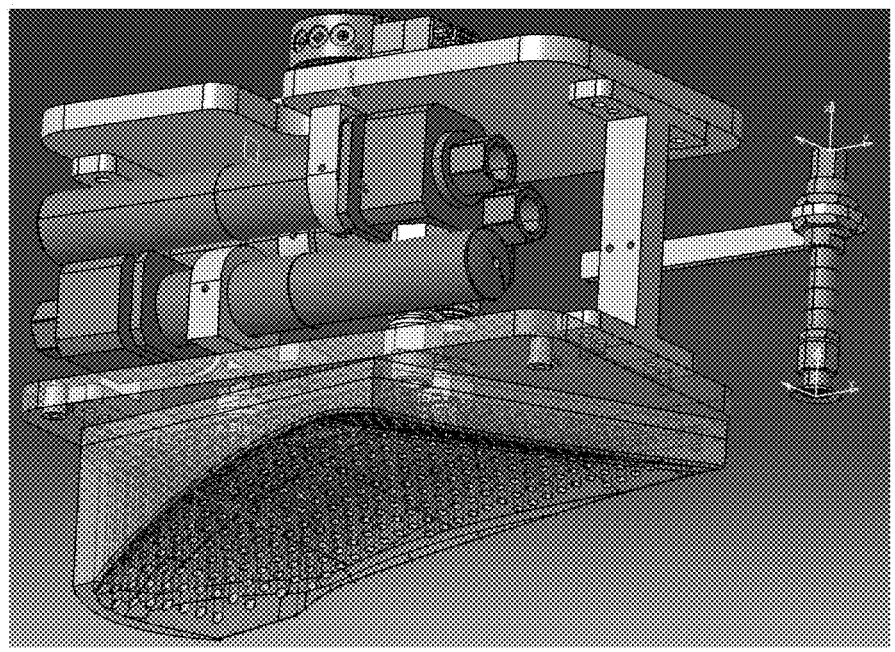

Construction and Mechanism of the First Fixture (Referred to as the 'Negative' Fixture):

The first fixture includes a 'negative' surface (302) that holds the film and mates with the tank surface upon impingement on the tank by the robot (shown in FIG. 3). The normal stress built into the film by the suction holes on the negative surface ensure the areal strain needed to stretch/conform the film to a complex contoured 3D surface. The suction is created by the suction pipes and venturies (402) as shown in FIG. 4. FIG. 5 illustrates a pneumatic circuit to create suction according to one embodiment of the present invention. The female tool changer (504) of the first application fixture is engaged with the male tool changer (502) of the robot for secure engagement. The air suction mechanism by the venturies (506) creates the required suction force at the negative surface (508). The mechanism and pneumatic circuit of the first application fixture is explained further in FIG. 6-9.

It is required to generate the exact negative shape of the film before placement in order to achieve a bubble free, wrinkle free and accurate positioning of the adhesive film on the tank surface. Each tank has a complicated 3D profile which is correspondingly mapped to a 3D stress profile required to hold the film taught before placement. For each discrete coordinate (x, y, z), based on the film is mapped to a corresponding stress tensor value can be computed by simulation using the known stress constants of the film:

$$\begin{bmatrix} \sigma_x & \tau_{xy} & \tau_{xz} \\ \tau_{xy} & \sigma_y & \tau_{yz} \\ \tau_{xz} & \tau_{yz} & \sigma_z \end{bmatrix}$$

where the elements $\sigma_x$, $\sigma_y$, $\sigma_z$ are called the orthogonal normal stresses (relative to the chosen coordinate system), and $\tau_{xy}$, $\tau_{xz}$, $\tau_{yz}$ the orthogonal shear stresses. By calculating the stress tensor values for each discrete coordinate, a 3D stress profile map is obtained (shown in FIG. 32).

Figure 10:
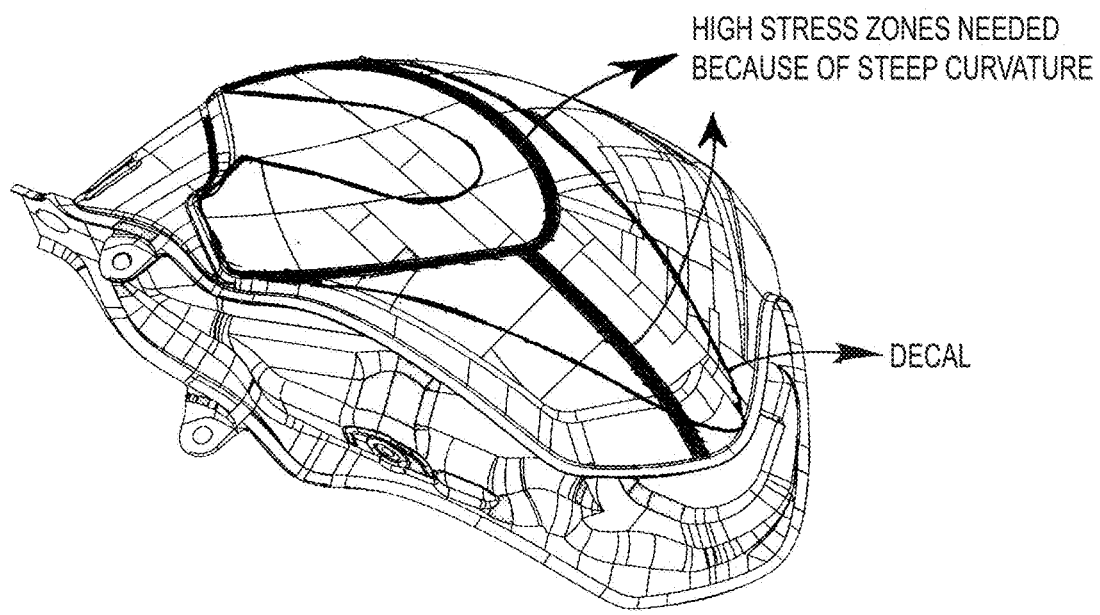
FIG. 10 illustrates high stress zones on a typical bike fuel tank because of steep curvature according to one embodiment of the present invention.
Figure 11:
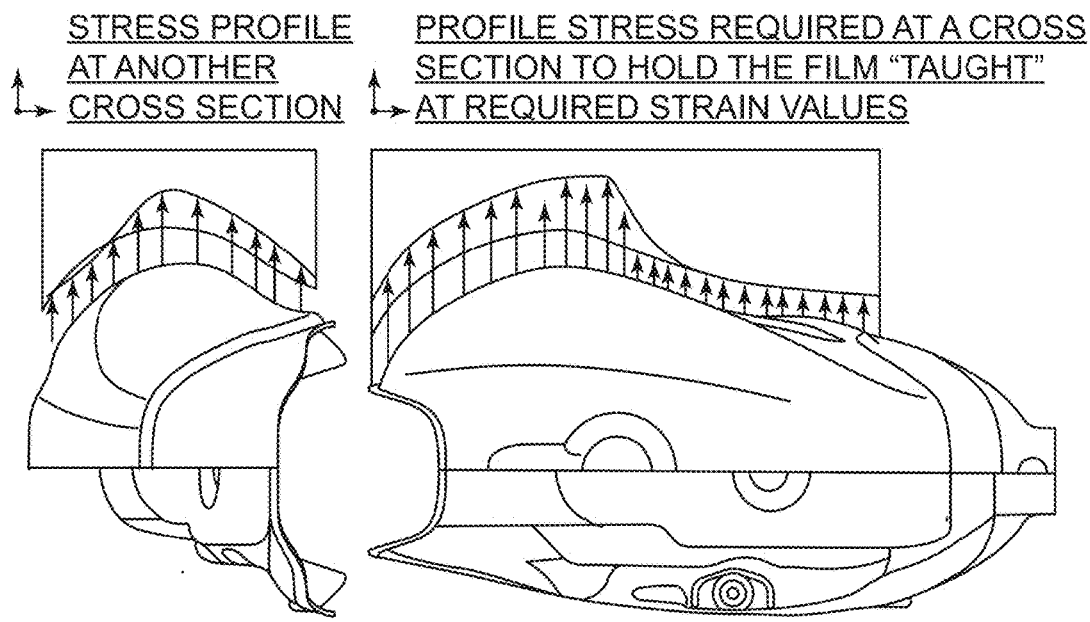
FIG. 11 illustrates stress profile required at a cross section to hold the film 'taught' at required strain values of an exemplary 3D surface.

FIG. 10 shows high stress zones on a typical bike fuel tank because of steep curvature. FIG. 11 illustrates stress profile required at a cross section to hold the film 'taught' at required strain values of an exemplary 3D surface.

Figure 12:
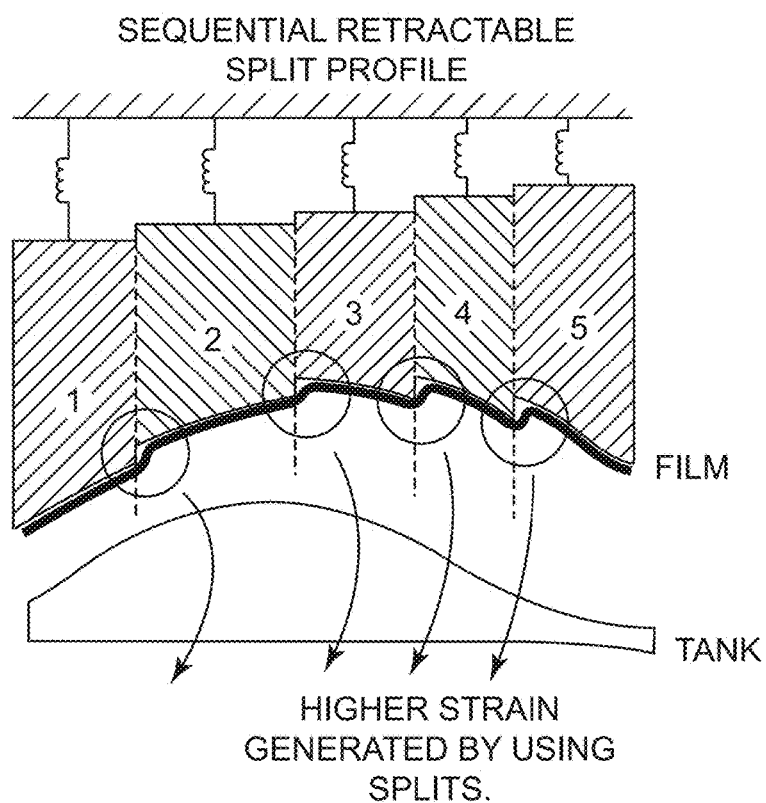
FIG. 12 illustrates sequential retractable split profile which generates higher strain on an exemplary 3D surface.

This stress profile can in turn be approximated by a normal suction force provided by the fixture. The holes are provided at angles that best approximates the required stress profile. A "split negative profile" may-be used to generate a differential strain in the film as shown in FIG. 12, where it may not be possible to use suction to generate the designed stress value. The suction maybe programmable and controlled to generate the required 3D stress profile as needed. Therefore, a different tank variant requires a change in the 3D profile of the suction generation. The fixture's profile surface also requires to be changed accordingly.

The details about the second application fixture and the squeegee application are explained later.

Figure 13:
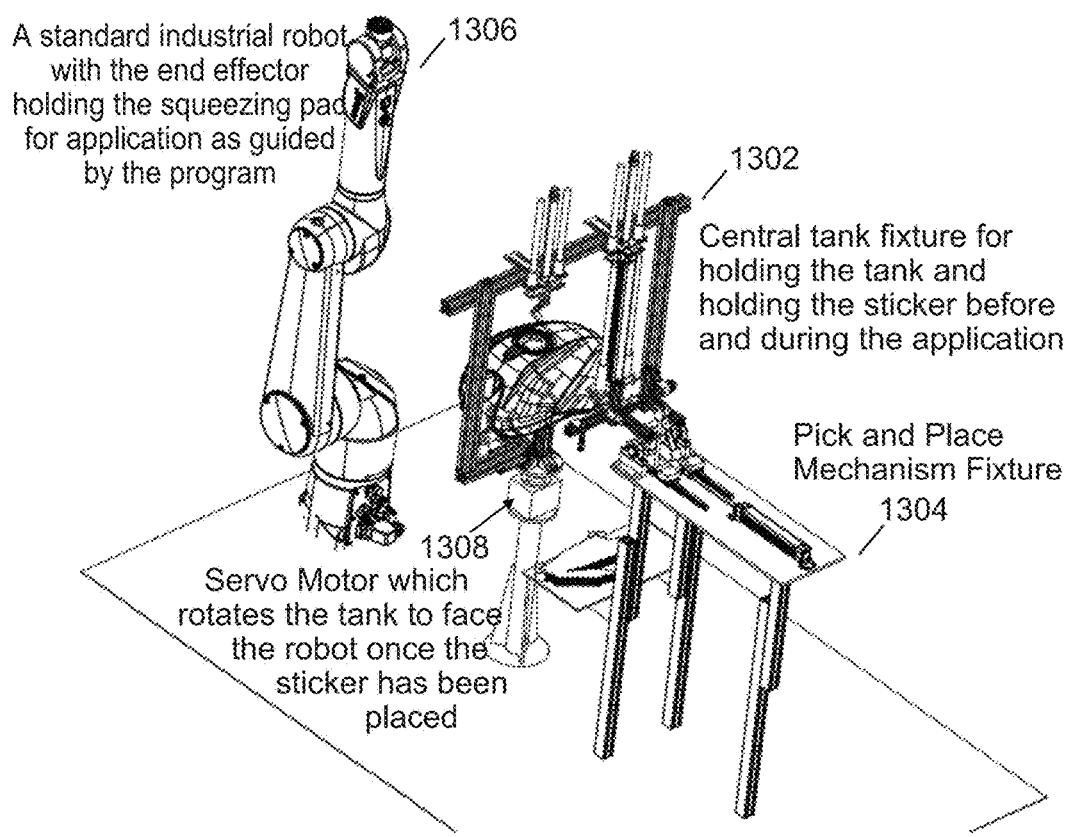
FIG. 13 illustrates an automated system for applying decals or graphic films on complex 3D surfaces without wrinkling or without entrapment of bubbles according to second embodiment of the present invention.

FIG. 13 illustrates an automated system for applying decals or graphic films on complex 3D surfaces without wrinkling or without entrapment of bubbles according to second embodiment of the present invention. The system primarily includes an object holding fixture 1302 for holding the tank and holding the decal before and during application, a pick and place mechanism 1304 for picking the decals from decal stack and placing them one by one on the surface of the tank and a robotic arm with end effector holding the squeezing pad (1306) for squeezing application. The object holding fixture includes a servo motor (1308) which rotates the tank to face the robot once the decal has been placed.

Figure 14:
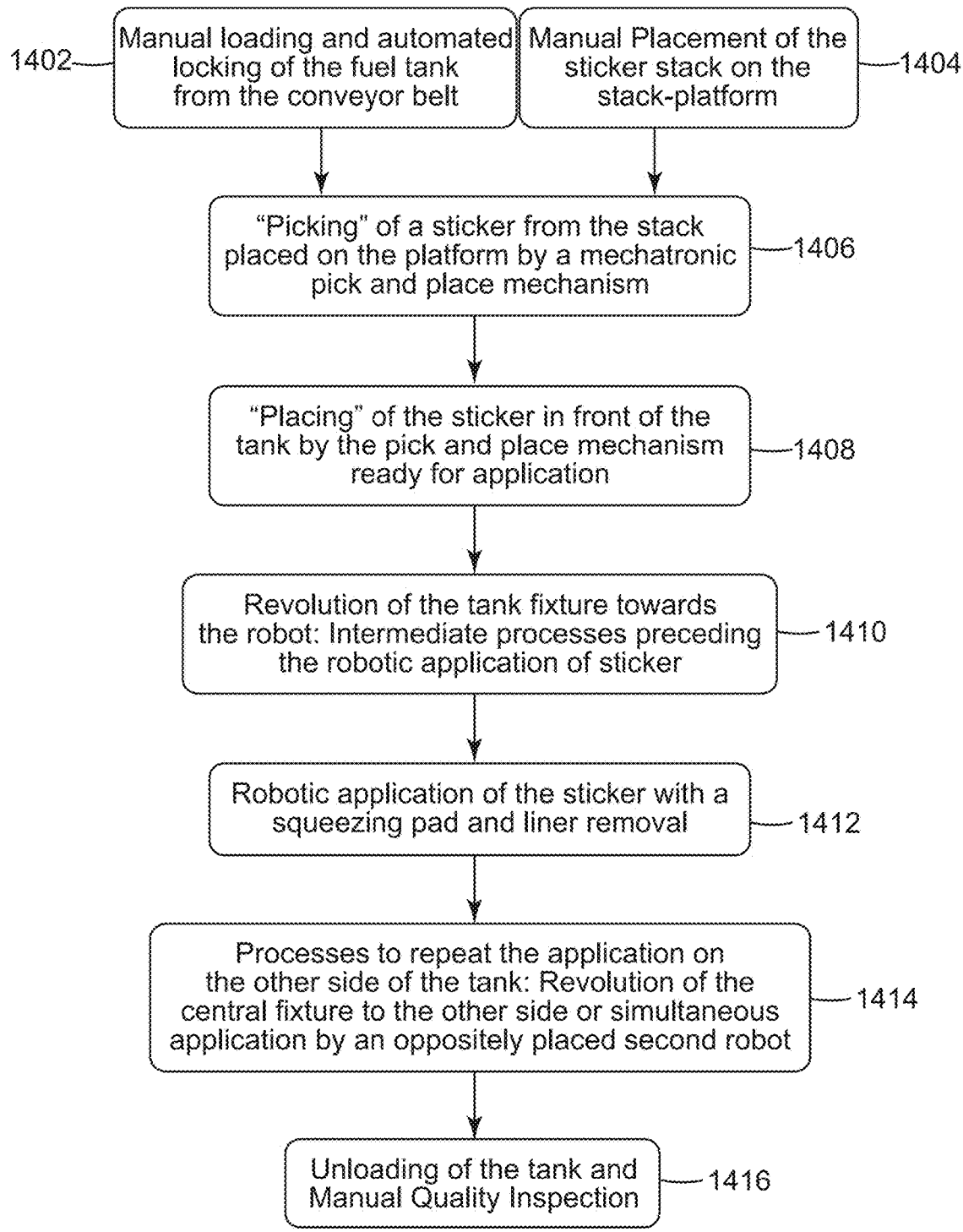
FIG. 14 is a flow diagram illustrating the different steps of the process automation for applying decals or graphic films on complex 3D surfaces without wrinkling or without entrapment of bubbles according to second embodiment of the present invention.

FIG. 14 is flow diagram illustrating the different steps in the process automation for applying decals or graphic films on complex 3D surfaces without wrinkling or without entrapment of bubbles according to second embodiment of the present invention. It is to be noted that more than one consecutive step may be executed together based on feasibility to reduce the process cycle time. Initially at step 1402, manual loading of the fuel tank is performed by an operator from the conveyor belt and the fuel tank is automatically locked by a object holding fixture. Next, the operator manually places the decal stack on the stack platform at step 1404. The decals are automatically picked one by one from the decal stack by the mechatronic pick and place mechanism at 1406. After picking, the decal is placed in front of the tank by the pick and place mechanism at 1408 for ready application. At step 1410, a predefined degree of revolution is performed of the object holding fixture for robotic application of decals. Then a squeezing application fixture is applied to complete the squeegee application by pressurizing the decal with a squeezing pad upon removal of liner at step 1412. Next at step 1414, the tank is rotated by 180 degree and the same processes are repeated on the other side of the tank. Finally, the tank is unloaded from the object holding fixture upon manual quality inspection by the operator at 1416.

Figure 15:
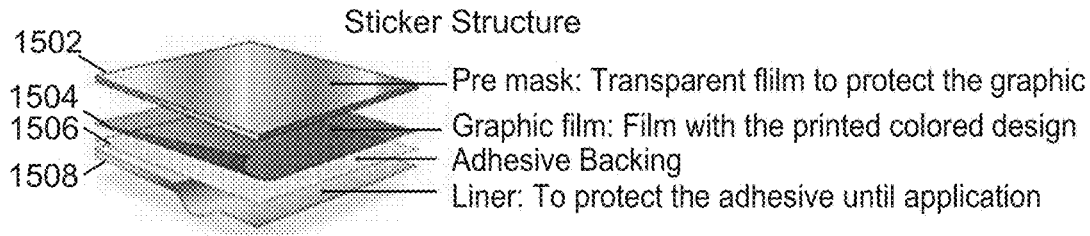
FIG. 15 illustrates configuration of a typical decal structure.

FIG. 15 illustrates configuration of a typical decal structure. Typically a decal includes a pre mask (1502) which is a transparent film to protect the graphic, a graphic film (1504) which is a film with the printed colored design, an adhesive backing (1506) and a liner (1508) to protect the adhesive prior to application.

Figure 16:
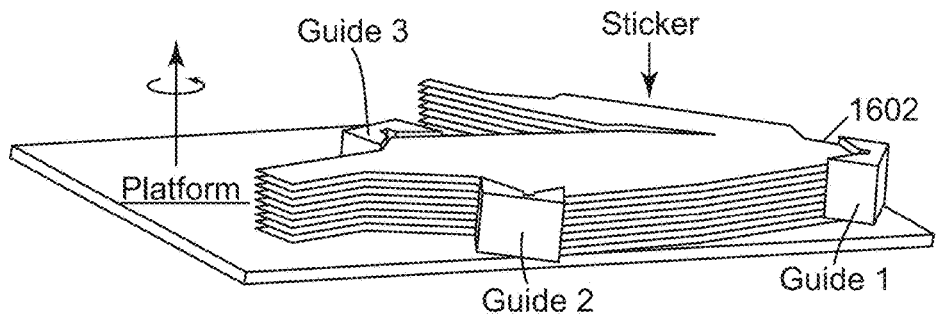
FIG. 16 illustrates an exemplary embodiment of a decal stack.

Manual Placement of the Decal Stack on the Stack-Platform:

Decals are supplied to two wheeler OEMs in stacked form. A 'stack' refers to fixed number of identical decals of a particular design bunched together. Consequently, there may be only one tank design that is compatible with a particular decal stack. However, a single fuel tank may be compatible with differently colored designs of the same decal. The current automation system requires that certain number of same fuel tanks requiring the same colored design of decal be applied consecutively from the conveyor belt. The operator must ensure that the correct tank and the corresponding decal stack are being used in the system. Before the application cycles are begun, the operator places the decal stack in the platform as illustrated in FIG. 16. The guides (1602) ensure that each decal in the stack is accurately positioned. The height of the guides is kept larger than the height of the decal stack as shown in FIG. 16.

Figure 17:
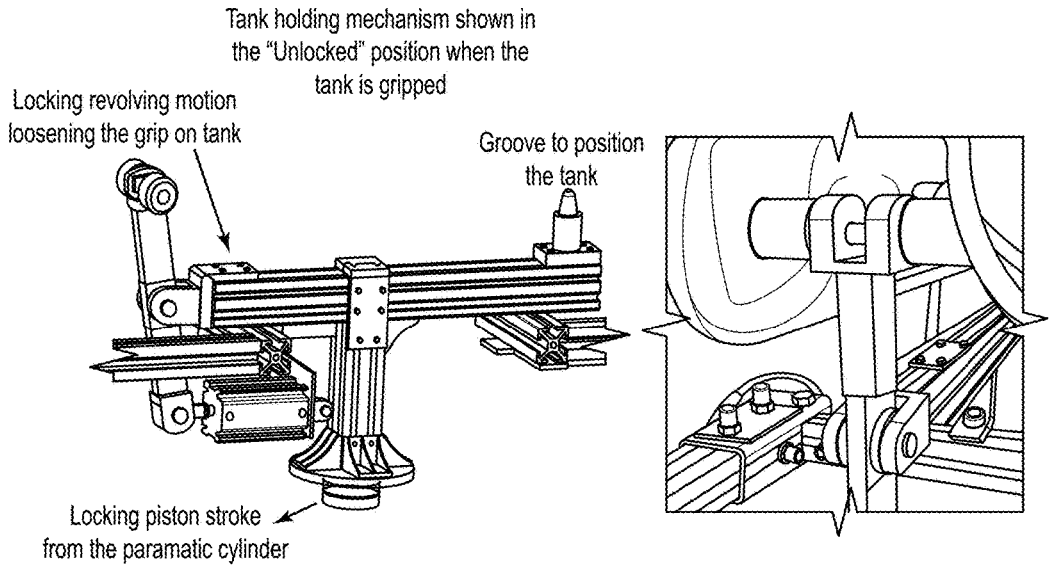
FIG. 17 illustrates an exemplary embodiment of an object holding fixture mechanism according to one embodiment of the present invention.

Manual Loading of the Fuel Tank from the Conveyor Belt onto the Tank Fixture:

Fuel tanks are moved on the production lines using conveyor belts. The operator removes one tank at a time from the conveyor and places it on the objet holding fixture (also referred as Tank fixture) as shown in FIG. 17. After the tank has been placed on the fixture in the appropriate position as shown, operator moves away into the earmarked safety zone away from the robot and begins the automation program by a remote controller that communicates with the Robot. Locking of the tank is actuated by a mechanism driven by a pneumatic cylinder so as to avoid any random perturbations and vibrations of the tank about the application plane during the process (See FIG. 19). This is necessary to ensure that the space coordinates of the tank with respect to robot are constant after repeated cycles and also during the application cycle. The solenoid switching the cylinder piston 'on' and 'off' corresponding to forward and retraction stroke) is signaled by the Robot's program. The automation program can be timed to ensure complete safety of the operator.

Pick and Place Mechanism

Figure 18:
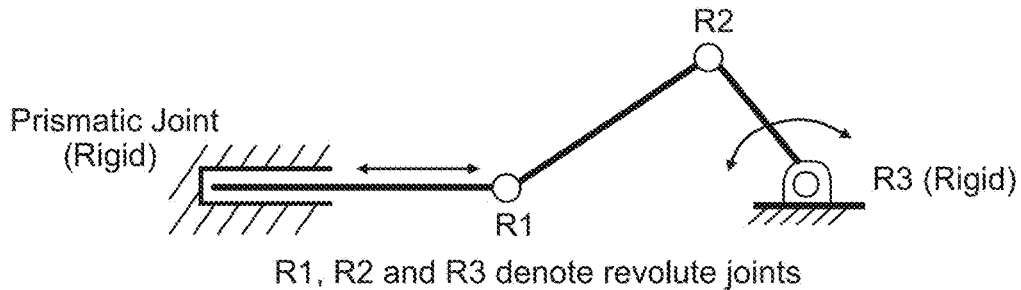
FIG. 18 schematically illustrates a kinematic diagram of a pick and place mechanism according to one embodiment of the present invention.
Figure 19:
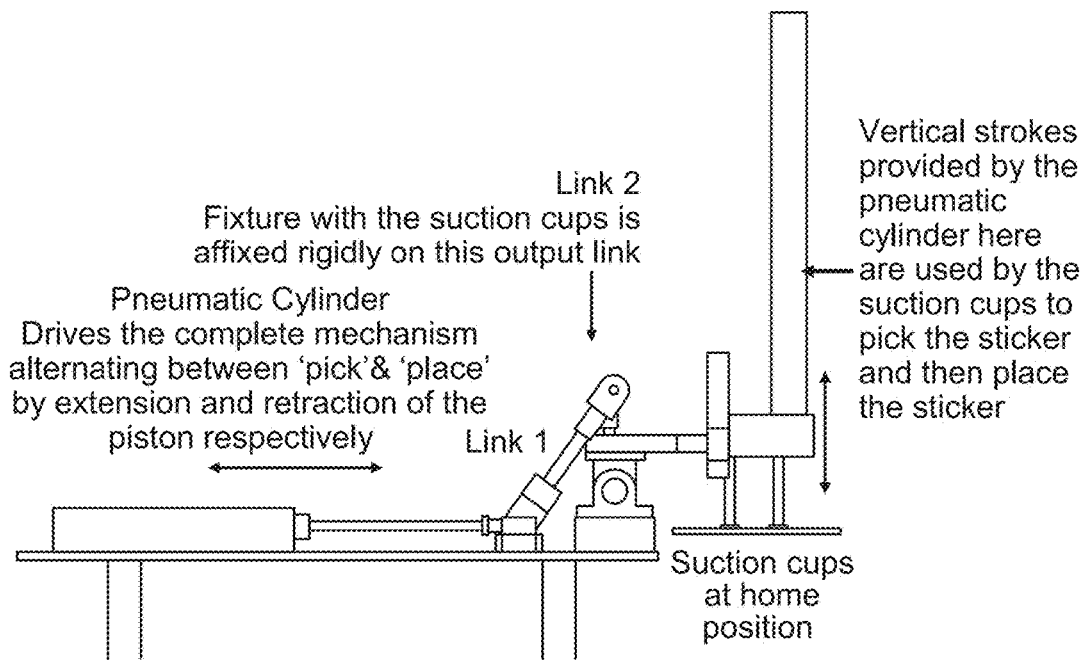
FIG. 19 schematically illustrates construction of a pick and place mechanism according to one embodiment of the present invention.
Figure 20:
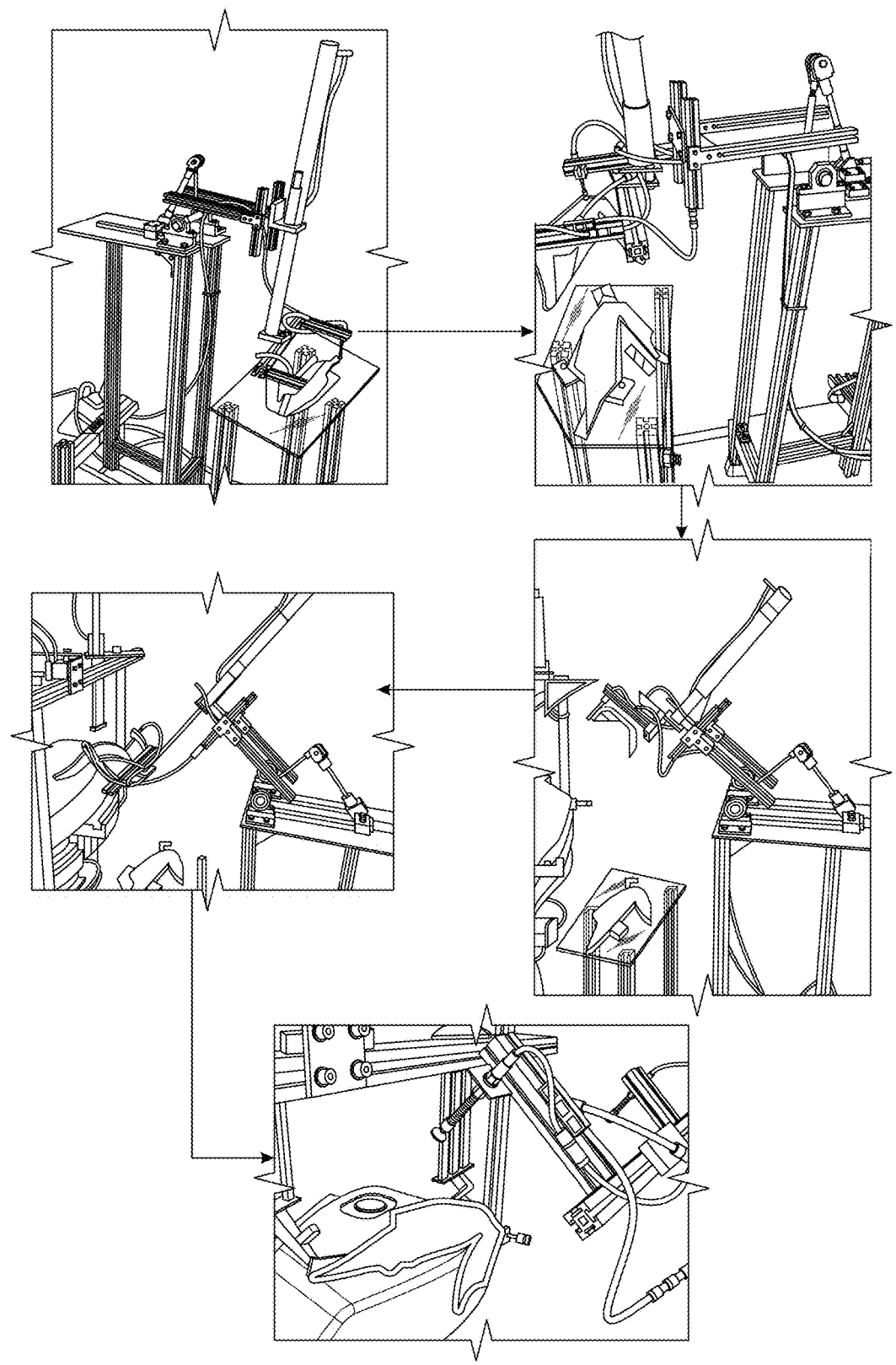
FIG. 20 illustrates sequence of steps performed by a pick and place mechanism according to one embodiment of the present invention.

A mechatronic four bar mechanism with one prismatic joint and three revolute joints along with suction cups are used to automate the accurate positioning of decal after picking it from the decal-stack. The kinematic schematic diagram of the mechanism is illustrated in FIG. 18. Prismatic joint is actuated by a pneumatic cylinder (solenoid signaled by the robot program) which drives the four bar mechanism as shown in FIG. 19. The pick and place automation is performed by the mechanism as illustrated in the sequence of illustrations in FIG. 20.

Modular Adjustable Structure of the Pick and Place Mechanism

Different decals and different tank designs demand the decal to be placed at different angular positions with respect to the fixed position of the tank for a flawless adhesive application so as to avoid any entrapment of bubbles or any wrinkling. The pick and place mechanism has been designed to be modular and adjustable to different angles as discussed below. With required adjustments prior to application, the same pick and place mechanism may be used for different decals and tanks.

Figure 21:
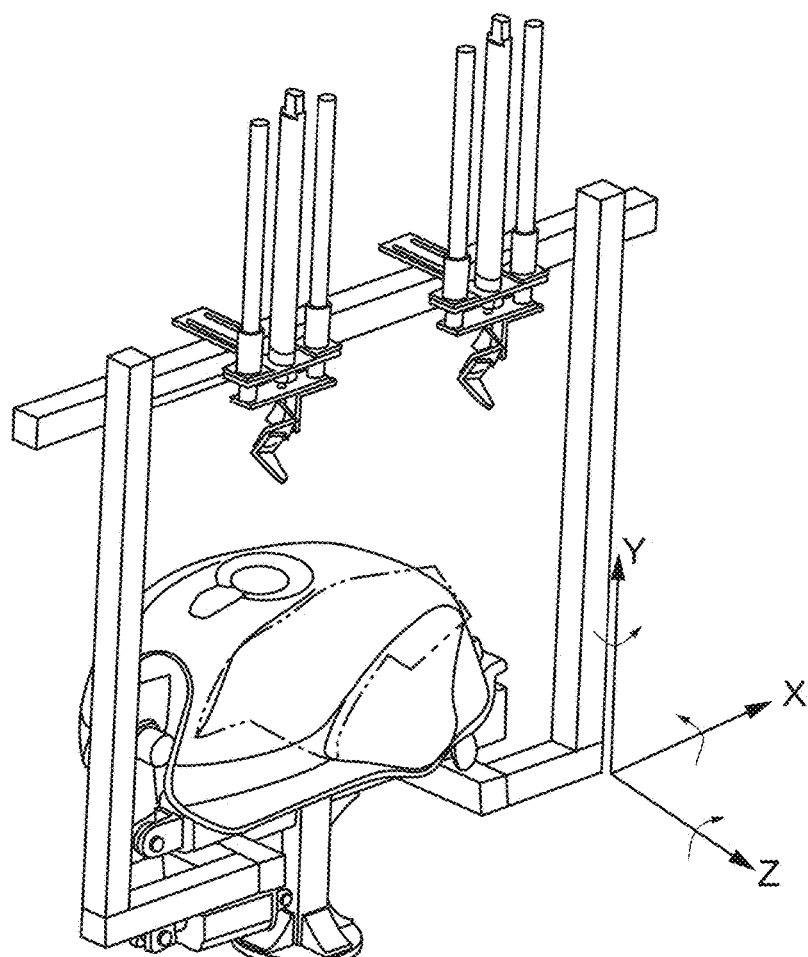
FIG. 21 illustrates an object holding fixture according one embodiment of the present invention.

The different decals may need to be placed in different orientations for different tanks which translate into accommodating degrees of flexibility in the mechanism to allow for small rotations about the three axes (shown in FIG. 21).

Figure 22:
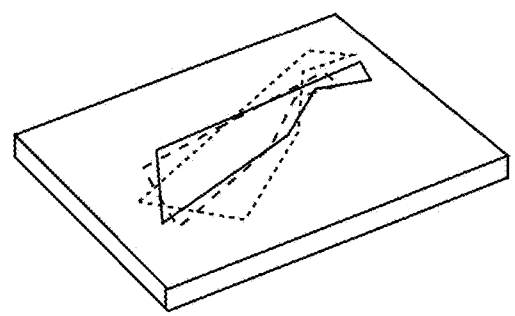
FIG. 22 illustrates flexibility in XY plane by suitably orienting the decal stack on the stack platform according to one embodiment of the present invention.

Rotation in the XY plane (i.e. rotation about the z axis) is achieved by suitably orienting the decal stack on the platform before the 'pick' process (as shown by in FIG. 22). So by changing the position of guides on the stack platform, XY flexibility can be attained.

Figure 23:
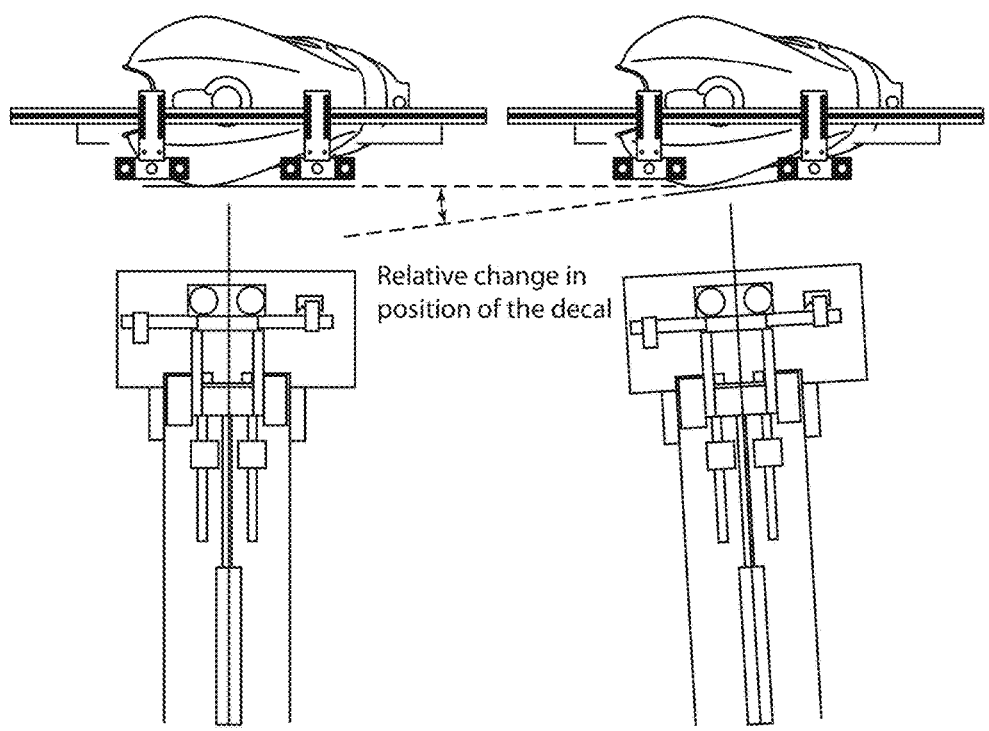
FIG. 23 illustrates flexibility of XZ plane by changing relative position of pick and place mechanism with a 3D surface according to one embodiment of the present invention.

Flexibility to place the decal in the XZ plane (i.e. rotation about the Y axis) can be achieved by changing the relative position of the axis of pick and place mechanism with respect to the fixed tank position (FIG. 23). The axis of pick and place may be shifted by physically shifting the complete pick and place fixture.

Figure 24:
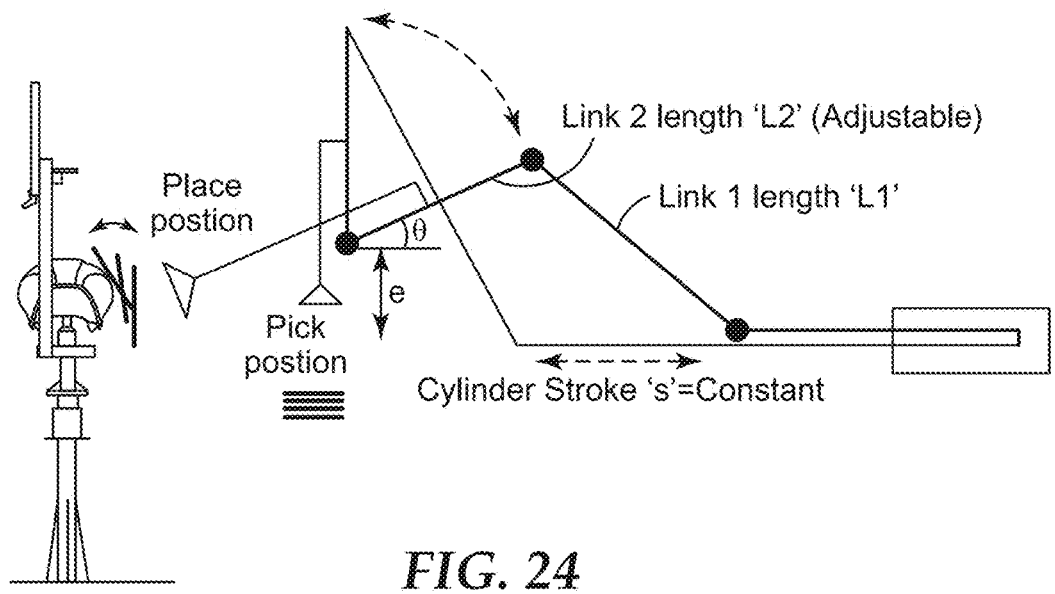
FIG. 24 illustrates flexibility in YZ plane by having variable link lengths in the four bar spick and place mechanism according to one embodiment of the present invention.

Flexibility in YZ plane (illustrated in FIG. 24), rotation about X axis is realized by having variable link lengths in the four bar mechanism. The details are explained below.

Figure 25:
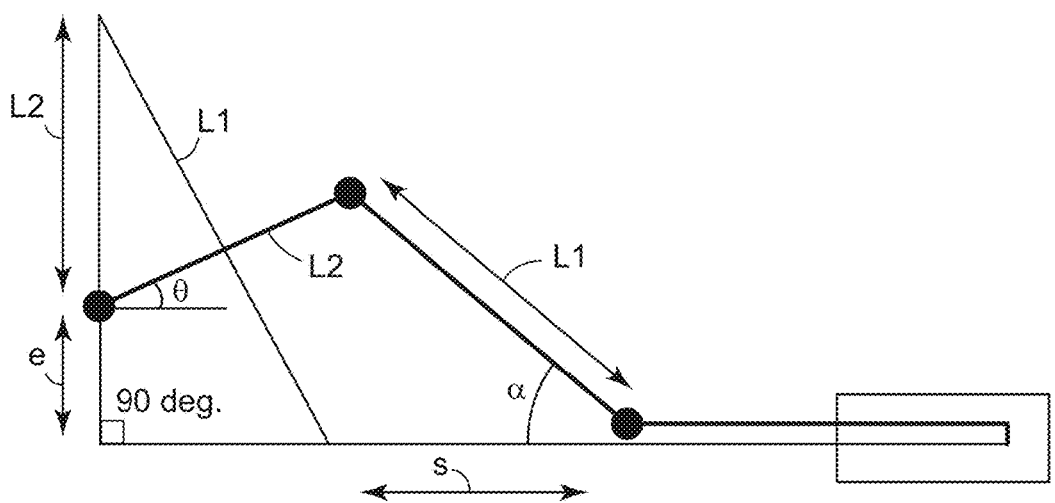
FIG. 25 illustrates kinetic diagram of pick and place mechanism for calculation to determine range of L1 and L2 for 0 ranging between 0 to 45 degrees.

By having variable link lengths L1 and L2, the angle θ at the placing position can be varied according to the requirement. Cylinder stroke 's' and eccentricity 'e' are kept constant as it is much easier to change the link lengths than changing cylinder strokes. θ is the final position at which the 'placing' operation is actuated (i.e. at initial position θ=90 degrees). This θ differs for different decals and tanks. However, it is unlikely that any tank would require an application angle θ greater than 45 degrees. Beyond, 45 degrees, the angle would be too acute for decal application. Calculations to Determine Range of L1 and L2 for θ Ranging Between 0 to 45 Degrees FIG. 25 illustrates kinetic diagram of pick and place mechanism for calculation to determine range of L1 and L2 for θ ranging between 0 to 45 degrees.

Analysis Equations $$L1 \cos \alpha + L2 \cos \theta = s + \sqrt{[(L1^2 - (L2+e)^2]}$$

And, $$L1 \sin \alpha = L2 \sin \theta + e$$

The above equations are solved for L1 and L2 in valid ranges assuming valid range of values of α, s and e. For e=40 mm and s=250 mm, following matrix is validated to produce different angles for 'place' operation.

| Θ (deg) | Link 1 (mm) | Link 2 (mm) |
|---|---|---|
| 0 | 200.0 | 140.4 |
| 10 | 204.2 | 145.0 |
| 15 | 207.8 | 149.0 |
| 20 | 212.6 | 154.3 |
| 30 | 226.8 | 169.7 |
| 45 | 266.1 | 211.7 |

Figure 26:
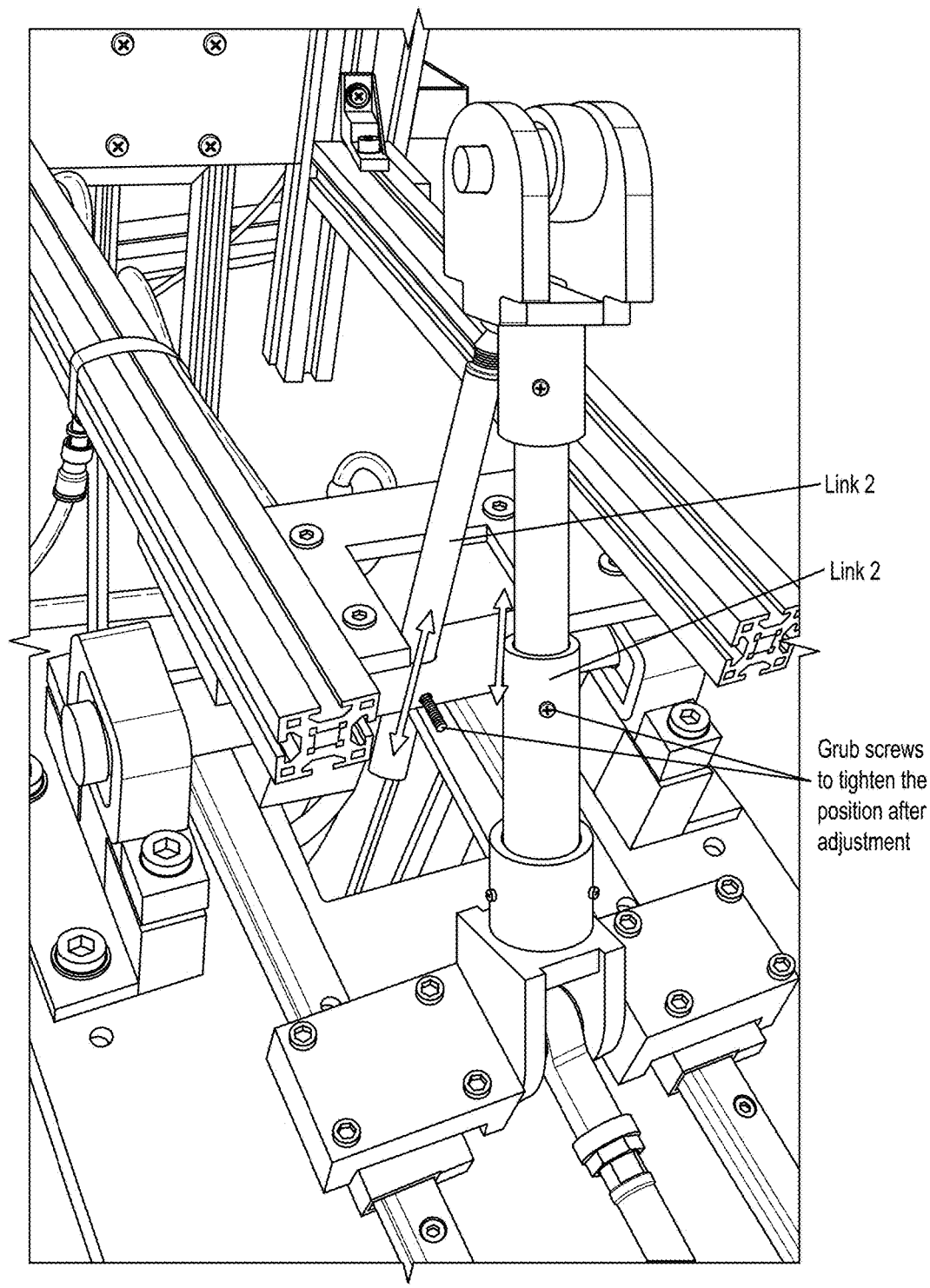
FIG. 26 illustrates links of the pick and place mechanism according to one embodiment of the present invention.

Variable link lengths are achieved practically by using telescopic shafts as links as shown in FIG. 26.

Figure 27:
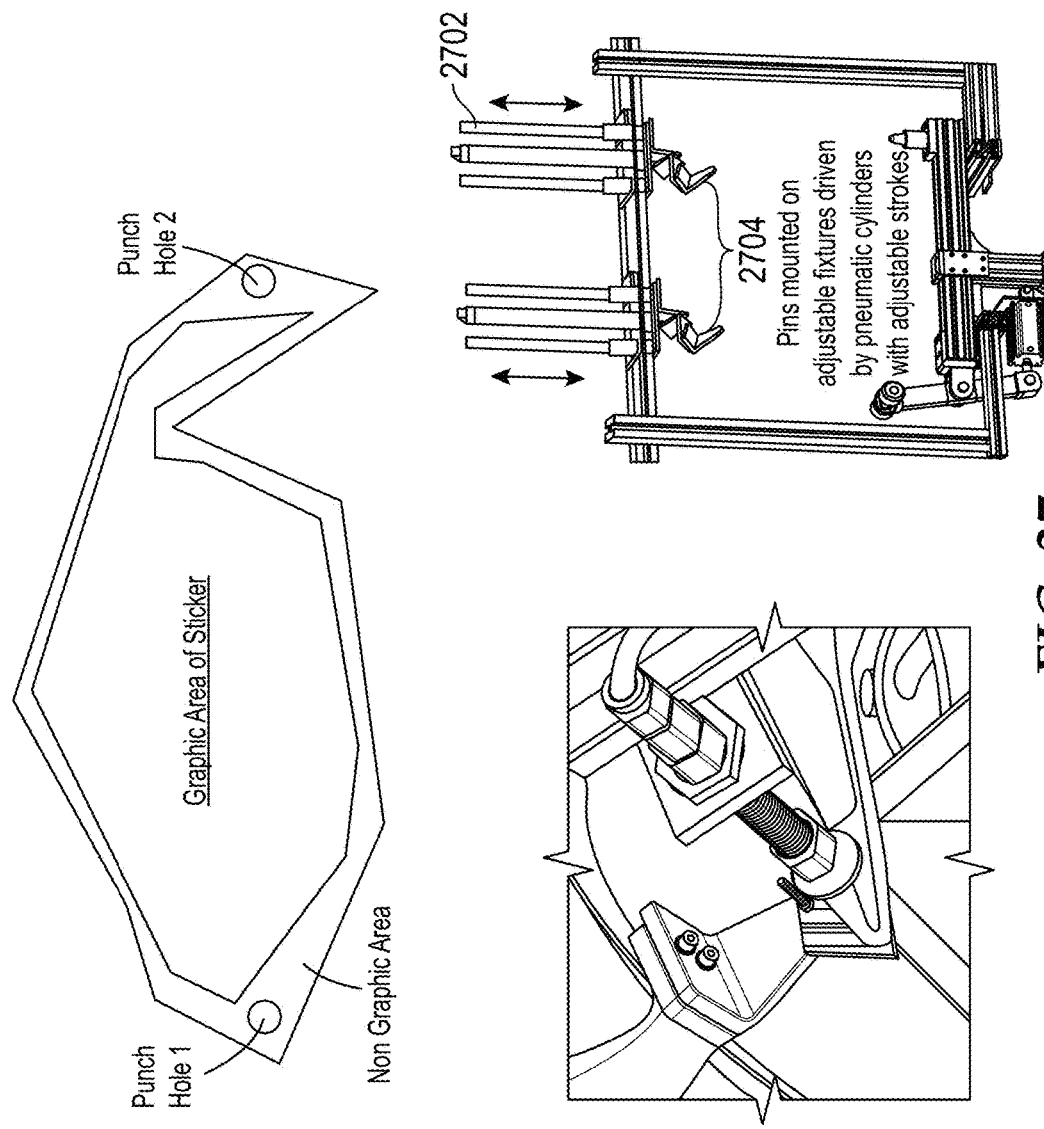
FIG. 27 illustrates pin mechanism to hold the decal according to one embodiment of the present invention.

Revolution of the Tank Fixture Towards the Robot: Intermediate Processes Preceding the Robotic Application of Decal At the end of pick and place operation, the decal is placed within two projecting pins (2704) provided on the tank fixture. The decals are provided with two punched holes for this placing operation. These pins are mounted on adjustable fixtures driven by pneumatic cylinders (2702) as shown in the illustration of FIG. 27. Location of the pins is a critical component in the system to ensure accurate placement of decal and to also make sure that pick and place operation is successful. The pre punched holes on the decal mate exactly with these accurately positioned pins. Once the decal 'sits' onto these pins, the central fixture is indexed by 180 degrees by the servo motor to face the robot so that liner removal and decal application can be completed by the robot.

Pneumatic cylinders with guides and collars (for adjustable strokes) are provided to ensure that the same fixture can be used for different decals and tanks. The actuation of these cylinders is programmed for piston extension just before the 'place' operation happens. The reason for keeping these pins movable is to retract them upwards out of application zone to avoid hindrance when not necessary.

Robotic Application of the Decal with a Squeezing Pad and Liner Removal

Liner Removal

Liner removal is a critical component of the operation as it exposes the Pressure Sensitive Adhesive of the decal. In a manual operation, liner is almost never removed completely, as the film with completely exposed adhesive becomes very difficult to handle as any stray contact with the surface may cause wrong application and subsequent wastage of the graphic. The current invention discloses provisions to remove the liner completely as well as in parts.

Figure 28:
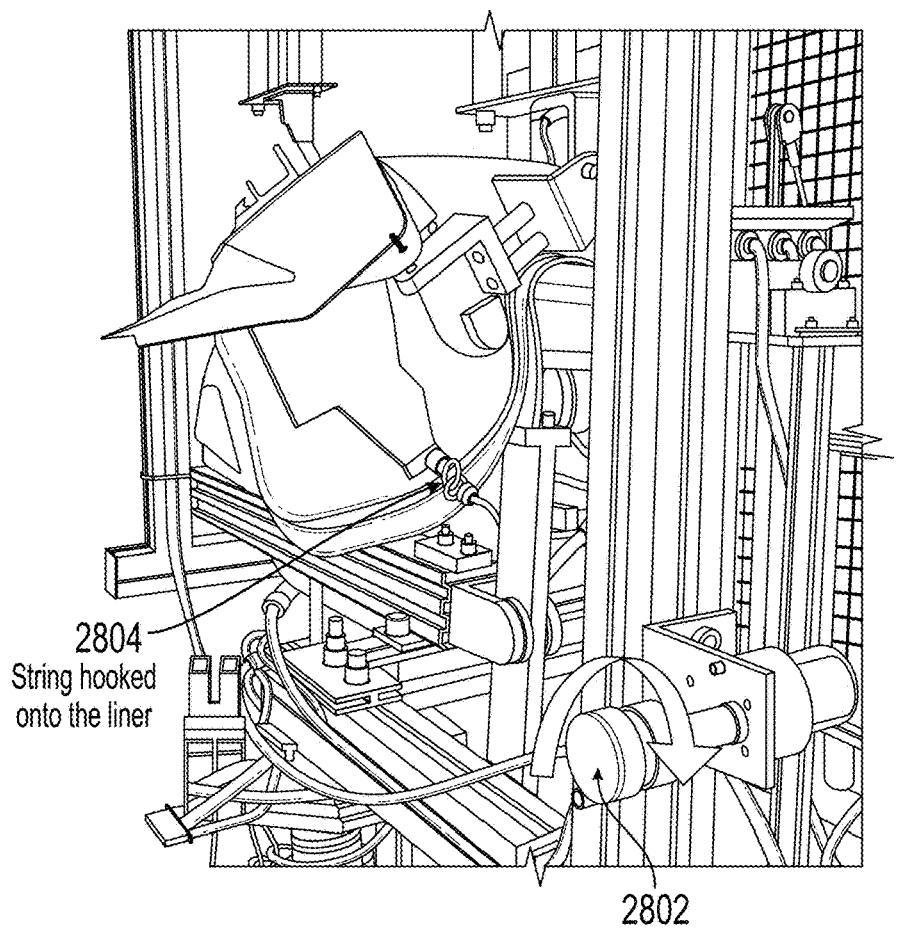
FIG. 28 illustrates an automated liner removal mechanism with DC motor with the wound string according to one embodiment of the present invention.

After the central fixture has rotated 180 degrees to face the robot, a little initial part of liner at the first application area is removed manually and hooked (2804) on to a string wound on a DC motor (2802). The motor is programmed to rotate in intermittent sequences to gradually expose the adhesive as the robotic application proceeds (FIG. 28).

Figure 29:
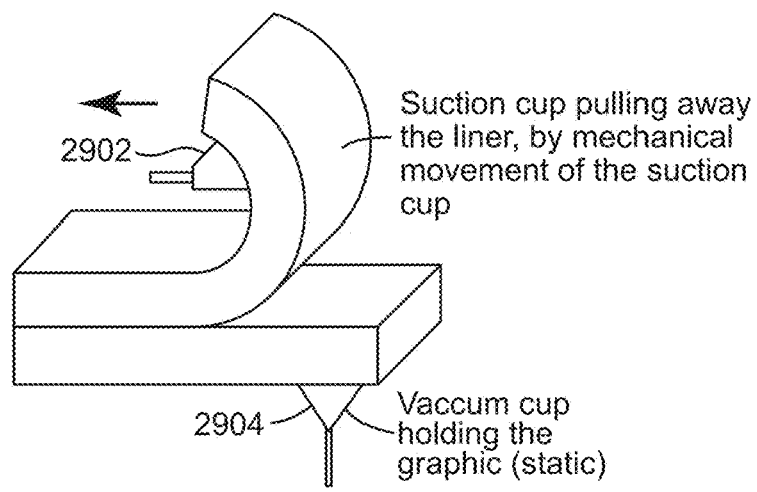
FIG. 29 illustrates an automatic liner removal mechanism with vacuum suction cups as an improvement to the present invention.

In another embodiment of the invention, to completely automate the liner removal operation, suction cups with differential vacuum suction cups may be used to separate the liner as illustrated in FIG. 29. The suction cup (2902) is used to pull the liner using mechanical movement where as the graphic of the film is held by vacuum cup (2904).

Robotic Application with a Squeezing Pad ('Squeegee')

Figure 30:
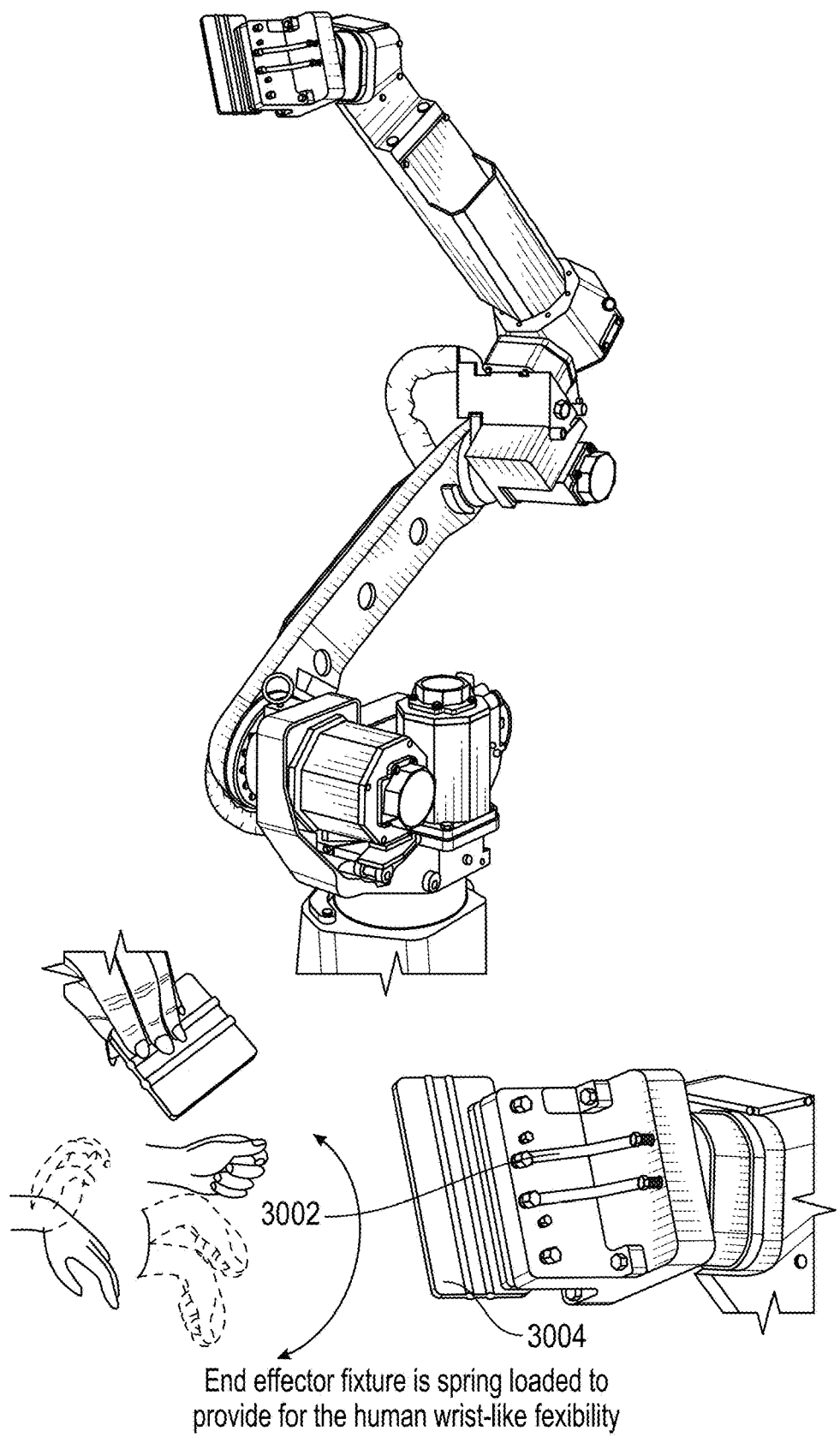
FIG. 30 illustrates a squeegee application fixture according to one embodiment of the present invention.
Figure 31:
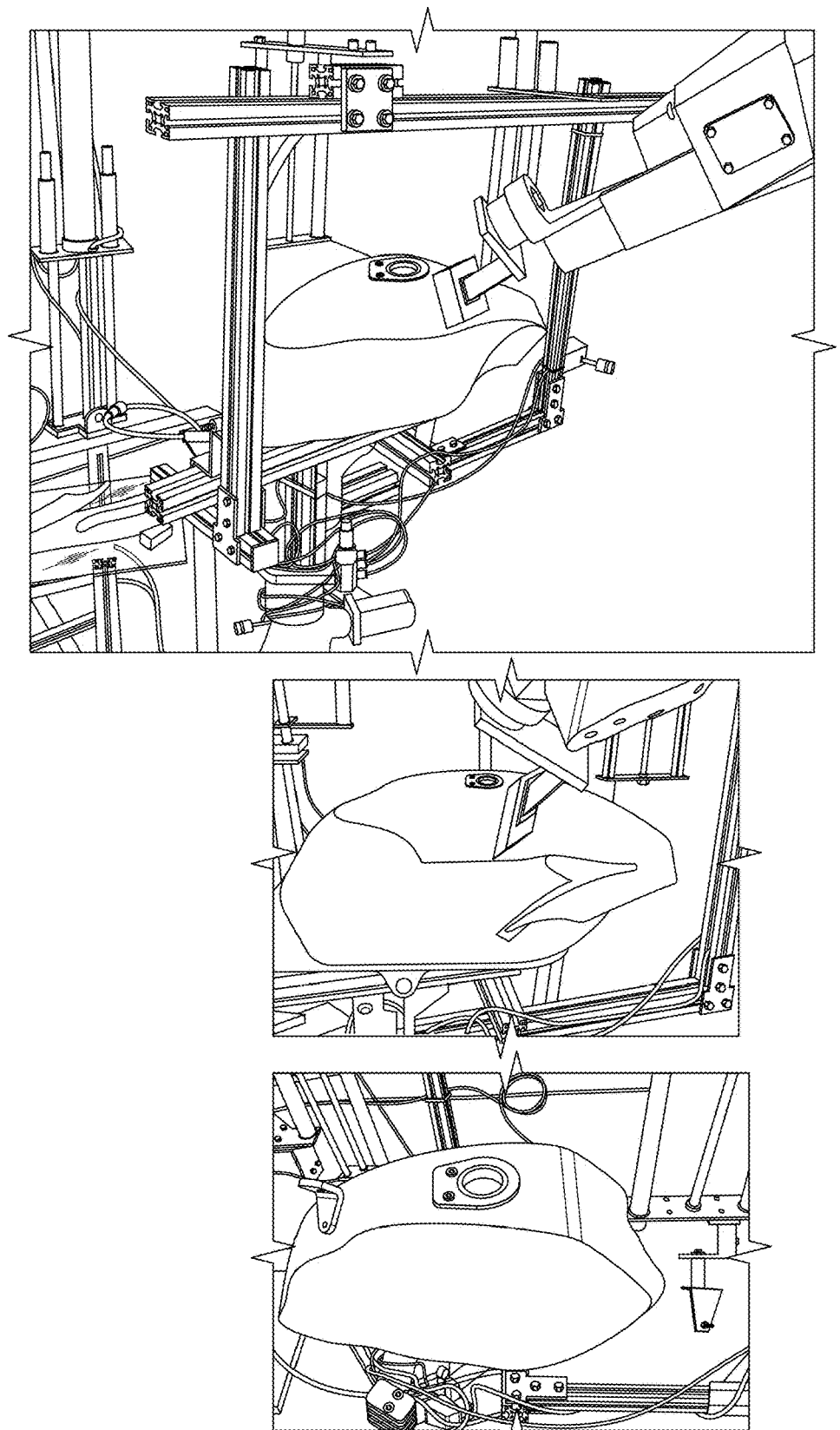
FIG. 31 illustrates robotic application of decals by hand motion simulation of the squeegee application fixture according to one embodiment of the present invention.

A standard industrial robot used on OEM production lines is utilized to simulate the hand movement of decal application (FIG. 30). The end effector (3002) of the robot is affixed with a squeezing pad (3004). This is the most crucial stage of automation which requires knowledge of the design, application, best practices associated with decal film and behavior of the decal film during application into robotic automated movement of the squeezing pad, without which application automation would be infeasible. Robot's program is written to simulate hand movement for a flawless application keeping in mind the behavior of the film as observed and experienced during manual application. Application strokes of the robot with the squeezing pad are generally executed intermittently interspersed with liner removal in parts to expose the adhesive in parts, followed by the application of the decal on the tank (FIG. 31).

Figure 32:
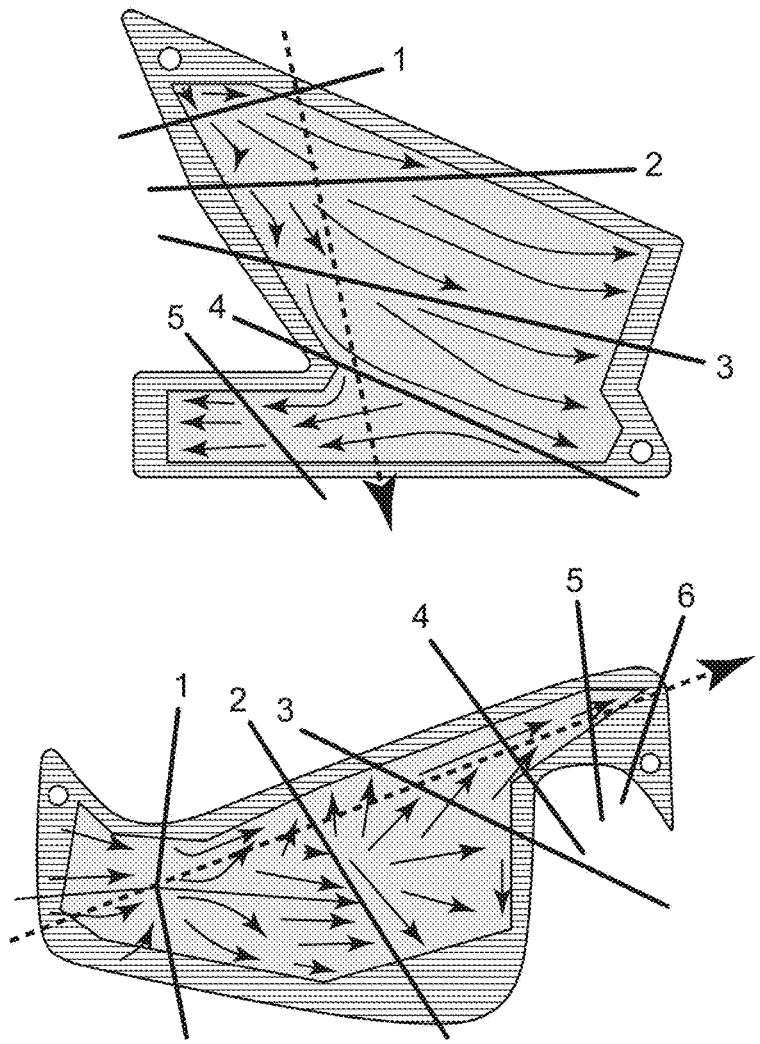
FIG. 32 illustrates application steps and direction of squeegee strokes for exemplary decals according to one embodiment of the present invention.

The involved complexity of application of decal as it is programmed in a 3D space is illustrated in FIG. 32 for two different example decals (for two different tanks).

As is evident from FIG. 32, the regions earmarked for step wise application followed by correct direction of squeezing pad while pressurized application by the robot and step wise removal of liner in the direction are critical 3D geometric parameters which differ for each decal. These are critical because decal film is a saggy suspension and while automation; the graphic cannot be repeatedly removed upon wrong application to correct the errors (as is done in manual application).

In a typical 3 shifts per day operation of OEMs, more than three to four models of bike tanks go through the paint shop for graphic application. All the operator needs to do is change the graphic application program in the robot based on the running model. These programs can be stored in the robot memory for retrieval.

After the graphic application is complete, the tank is unlocked and is loose for removal and inspection by the operator and program terminates one loop of execution. The operator may enter the application zone and remove the tank for inspection and load the next fuel tank for application.

It is to be understood by a person of ordinary skill in the art that various modifications and variations may be made without departing from the scope and spirit of the present invention. Therefore, it is intended that the present invention covers such modifications and variations provided they come within the ambit of the appended claims and their equivalents.

We claim:

1. A method of robot assisted automated decal application on complex 3D surfaces without resulting in wrinkling and without entrapment of bubbles, the method comprising:
   i) loading of objects having 3D surfaces on an object holding fixture manually one by one by an operator from a conveyor belt;
   ii) picking up a first application fixture automatically by a robot and facing the first application fixture towards the operator;
   iii) peeling of a liner disposed on the decal manually by the operator and placing the decal on the first application fixture which holds the decal by suction through the application fixture;
   iv) positioning the decal with exposed adhesive accurately on a first 3D surface of the object and switching off the suction automatically leaving the decal placed on the first 3D surface of the object;
   v) placing the first application fixture back and picking up a second application fixture automatically by the robot for squeegee application;
   vi) applying the second application fixture to complete the squeegee application by pressurizing the decal;
   vii) performing 180 degree revolution of the object automatically by the object holding fixture and repeating steps iii to vi on a second 3D surface of the object; and
   viii) unloading the object from the object holding fixture upon manual quality inspection by the operator,
   wherein the first application fixture is configured to be programmed to hold decals of different shape and size and the second application fixture is configured to be programmed to identify a 3D direction of squeezing pad motion within each region of such decals to eliminate the bubbles without wrinkling.

2. The method of robot assisted automated decal application on complex 3D surfaces as claimed in claim 1, wherein the first application fixture comprises a negative surface that holds a film and mates with the first 3D surface upon impingement on the object by the robot, a normal stress built into the decal by suction holes disposed on the negative surface ensure an areal strain needed to conform the film to a complex contoured 3D surface.

3. A system for robot assisted automated decal application on complex 3D surfaces, which is capable of performing the method steps as claimed in claim 2.

4. A system for robot assisted automated decal application on complex 3D surfaces, which is capable of performing the method steps as claimed in claim 1.

5. A method of robot assisted automated decal application on complex 3D surfaces without resulting in wrinkling and without entrapment of bubbles, the method comprising:
   i) loading of objects having 3D surfaces on an object holding fixture manually one by one by an operator from a conveyor belt, the object holding fixture is configured to lock the objects automatically;
   ii) placing a decal stack on a stack platform manually by the operator;
   iii) picking up a decal from the decal stack placed on the stack platform one by one automatically by a mechatronic pick and place mechanism;
   iv) placing of the decal on first 3D surface of the object automatically by the mechatronic pick and place mechanism;

v) performing a predefined revolution of the object automatically by the object holding fixture;

vi) applying a squeezing application fixture to complete the squeegee application by pressurizing the decal with a squeezing pad upon removal of liner;

vii) performing 180 degree revolution of the object automatically by the object holding fixture and repeating steps iii to vi on a second 3D surface of the object; and viii) unloading the object from the object holding fixture upon manual quality inspection by the operator, wherein the mechatronic pick and place mechanism and the object holding fixture are configured to be programmed for accurate application of the decals of various size and shape on the 3D surface and squeezing application fixture is configured to be programmed to identify the 3D direction of squeezing pad motion within each region of such decals to eliminate the bubbles without wrinkling.

6. The method of robot assisted automated decal application on complex 3D surfaces as claimed in claim 5, wherein the pick and place mechanism comprises a mechatronic four bar mechanism with one prismatic joint, three revolute joints and plurality of suction cups to automate the accurate positioning of decal after picking from the decal-stack.

7. A system for robot assisted automated decal application on complex 3D surfaces, which is capable of performing the method steps as claimed in claim 6.

8. The method of robot assisted automated decal application on complex 3D surfaces as claimed in claim 5, wherein the pick and place mechanism is configured to be modular and adjustable to different angle comprising rotation about X, Y, Z axis.

9. A system for robot assisted automated decal application on complex 3D surfaces, which is capable of performing the method steps as claimed in claim 8.

10. The method of robot assisted automated decal application on complex 3D surfaces as claimed in claim 5, wherein the object holding fixture comprises:
two projecting pins provided thereon to hold the decal at two punched holes for placing the decal accurately on the 3D surface; and
plurality of pneumatic cylinders with guides and collars which are capable of being programmed to be used for different decals and 3D objects.

11. A system for robot assisted automated decal application on complex 3D surfaces, which is capable of performing the method steps as claimed in claim 10.

12. The method of robot assisted automated decal application on complex 3D surfaces as claimed in claim 5, wherein the squeezing application fixture comprises a squeezing pad affixed at an end effector of the pick and place mechanism to simulate the preprogrammed hand movement to ensure bubble free and wrinkle free application of the decal.

13. A system for robot assisted automated decal application on complex 3D surfaces, which is capable of performing the method steps as claimed in claim 12.

14. A system for robot assisted automated decal application on complex 3D surfaces, which is capable of performing the method steps as claimed in claim 5.

* * * * *

UNITED STATES PATENT AND TRADEMARK OFFICE
CERTIFICATE OF CORRECTION

PATENT NO. : 9,988,173 B2
APPLICATION NO. : 15/024531
DATED : June 5, 2018
INVENTOR(S) : Aby Varghese Page 1 of 1

It is certified that error appears in the above-identified patent and that said Letters Patent is hereby corrected as shown below:

In the Specification

Column 4
Line 36, delete "0" and insert -- θ --, therefor. (first occurrence)

Column 7
Line 30, delete "corresponding" and insert -- (corresponding --, therefor.

Column 8
Line 17, delete "0" and insert -- θ --, therefor. (first occurrence)
Line 21, delete "0" and insert -- θ --, therefor. (first occurrence)

Signed and Sealed this
Twenty-ninth Day of January, 2019

Andrei Iancu
*Director of the United States Patent and Trademark Office*